United States Patent
Doerry et al.

(10) Patent No.: US 6,828,933 B1
(45) Date of Patent: *Dec. 7, 2004

(54) WAVEFORM SYNTHESIS FOR IMAGING AND RANGING APPLICATIONS

(75) Inventors: Armin W. Doerry, Albuquerque, NM (US); Peter A. Dudley, Albuquerque, NM (US); Dale F. Dubert, Cedar Crest, NM (US); Bertice L. Tise, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 10/436,631

(22) Filed: May 13, 2003

(51) Int. Cl.[7] .............................. G01S 7/35; G01S 13/90
(52) U.S. Cl. ........................ 342/194; 342/25; 342/195
(58) Field of Search ........................ 342/25, 194, 195, 342/192, 200, 202; 375/298, 300, 301, 346

(56) References Cited

U.S. PATENT DOCUMENTS 6,469,661 B1 * 10/2002 Doerry et al. ............... 342/194
2003/0095607 A1 * 5/2003 Huang et al. ............... 375/296

OTHER PUBLICATIONS

Huang et al., "Gain/phase imbalance and DC offset compensation in quadrature modulators," Circuits and Systems, 2002. ISCAS 2002. IEEE International Symposium on, vol. 4, Inspec Ass. No. 7446519.*

* cited by examiner

Primary Examiner—Ian J. Lobo
(74) Attorney, Agent, or Firm—Ortiz & Lopez, PLLC

(57) ABSTRACT

Frequency dependent corrections are provided for quadrature imbalance and Local Oscillator (LO) feed-through. An operational procedure filters imbalance and LO feed-through effects without prior calibration or equalization. Waveform generation can be adjusted/corrected in a synthetic aperture radar system (SAR), where a rolling phase shift is applied to the SAR's QDWS signal where it is demodulated in a receiver; unwanted energies, such as LO feed-through and/or imbalance energy, are separated from a desired signal in Doppler; the separated energy is filtered from the receiver leaving the desired signal; and the separated energy in the receiver is measured to determine the degree of imbalance that is represented by it. Calibration methods can also be implemented into synthesis. The degree of LO feed-through and imbalance can be used to determine calibration values that can then be provided as compensation for frequency dependent errors in components, such as the QDWS and SSB mixer, affecting quadrature signal quality.

23 Claims, 22 Drawing Sheets

WAVEFORM SYNTHESIS FOR IMAGING AND RANGING APPLICATIONS

STATEMENT OF GOVERNMENT INTEREST

The United States Government has rights in this invention pursuant to Department of Energy Contract No. DE-AC04-94AL85000 with Sandia Corporation.

FIELD OF THE INVENTION

The present invention is generally related to signal processing. More particularly, the present invention is related to methods and systems providing waveform synthesis for imaging and ranging applications such as RADAR, SONAR, LIDAR, medical imaging, tomography, and communications applications utilizing spread spectrum modulation/demodulation techniques.

BACKGROUND OF THE INVENTION

Although the present background describes the functionality and limitations of synthetic aperture radar systems or a particular class of communications, such description is merely provided to exemplify a problem capable of resolution with the present invention. Any discussion herein directed to specific radars or communications protocols should not be taken by those skilled in the art as a limitation on the applicability of the invention described herein.

Modern high-performance radar systems often generate signals of extraordinarily wide bandwidth. For example, the General Atomics Lynx Synthetic Aperture Radar (SAR) employs a Linear-FM (LFM) chirp waveform and can operate over 3 GHz bandwidth at a 16.7 GHz center frequency. Furthermore, maximum exploitation of these radar signals requires the generated waveforms to be of very high quality, possessing exceptional spectral purity.

To facilitate high-quality LFM chirp generation, a programmable Digital Waveform Synthesizer (DWS) can often be employed. Use of a GaAs ASIC has been shown to implement well known double accumulator architectures to generate a phase that is quadratic with time, a phase that is generally converted by a memory look-up table to a digital sinusoidal signal and is ultimately converted to an analog signal by a Digital to Analog Converter (DAC). Furthermore, an ability to predistort the phase of the output as a function of instantaneous frequency to correct for unspecified nonlinearities of subsequent components in the signal path has previously been explored. No calibration scheme, however, has been presented for determining correction factors.

Two principal architectures are presently employed for achieving LFM chirp generation. The first architecture 100 is referred to as single-ended output operation, and is illustrated in FIG. 1 (labeled as prior art). With this architecture a single signal output is generated by the DWS 110 and presented to subsequent components in the signal path. After mixing 115 with a Local Oscillator (LO) 120 signal the nature of a single-ended DWS signal is to generate the desired signal as well as an undesired mirror-image signal, which must be filtered by analog components in the signal path. This filter is often called a sideband filter 130. Consequently, desired and undesired signals are separated by frequency; limiting the usable bandwidth for a generated signal to something less than half the DWS clock frequency. Equivalently, a clock frequency of more than twice the highest output waveform frequency is required. Proper final system bandwidth is achieved through a frequency multiplier 140.

Multiplexing of multiple parallel chirp generators can allow wide bandwidth single-ended chirps to be generated with commercial silicon Field Programmable Gate Array (FPGA) components. Frequency multiplication can also be employed to widen the bandwidth of a single-ended DWS output signal, but often to the detriment of spectral purity. It is also well known that frequency multiplication raises undesired frequency spurs by 6 dB per doubling with respect to the desired signal level. Frequency spurs, however, are undesired signal perturbations caused by quantization effects and DAC residual nonlinearities. Consequently, minimizing the frequency multiplication factor that can be applied to a DWS output can enhance spectral purity.

A second architecture that has been used for achieving LFM chirp generation quality can be referred to as balanced or quadrature modulator operation. Such architecture is generally illustrated in FIG. 2 (also labeled as prior art). With this architecture 200, two output signals are generated by the Quadrature DWS (QDWS) 210 and presented to a Single Sideband (SSB) mixer 220 where they are combined 215 to form a single signal to the subsequent signal path. In a perfect system, the two signals generated by the QDWS 210 will differ by a constant 90 degrees of phase, and are termed the In-phase (I) and Quadrature-phase (Q) signals. The signal pair together can be generally referred to in the art as Quadrature signals. In a perfect SSB mixer 220, no mirror-image signal will be generated, obviating the need for a sideband filter. Furthermore, no spectral separation between desired and a nonexistent undesired signal would need to be maintained. Consequently, the QDWS 210 output bandwidth of the desired signal would be able to approach the QDWS clock frequency itself, which is twice the bandwidth of the single-ended DWS system. This, in turn, would require half the frequency multiplication 230 when compared to a single-ended DWS system to achieve a final system bandwidth, and include attendant 6 dB lower spur levels and better spectral purity.

SSB signal generation techniques, including the employment of quadrature signals, are generally known in the art. Quadrature signals can be generated by a variety of techniques, including Hilbert filters that generate a 90-degree phase shift for all input waveform frequencies, and directly by separate memory look-up tables within the digital signal generation portion of the QDWS. The precision with which quadrature signals can be generated and combined in a SSB mixer, however, is problematic, particularly for high-dynamic-range applications such as imaging radar systems. Imperfections in quadrature signal generation or their combination within a SSB mixer results in the non-cancellation of the undesired mirror-image sideband signal. Such imperfections can result in a relative phase error or an amplitude imbalance. Additionally, the LO 120 may undesirably leak through the mixer and be present in the mixer output in addition to the desired signal. Any of these errors reduce the spectral purity of the resulting SSB mixer output signal, and degrades a SAR image with ghosts and other artifacts. Consequently, quadrature modulators in high-performance radar systems require some form of error cancellation or other mitigation scheme.

In the field of communications, a quadrature modulator for wireless CDMA systems has been described wherein amplitude and phase of the quadrature component signals are predistorted to provide perfect quadrature signals to the SSB mixer. Furthermore, DC biases are added to the quadrature output signals to mitigate LO leakage. The corrections, however, are derived for a single QDWS output frequency and do not allow for frequency dependent errors. While this may be reasonable for applications such as wireless communications, it is inadequate for high-performance SAR systems. Furthermore, no attempt is made to compensate imbalances in the SSB mixer itself, and the stated procedure precludes this.

An iterative procedure to adjust for LO leakage, and phase and gain imbalance in a quadrature modulator based on an envelope detection-of a transmitted signal has also been described by the prior art. Other prior art techniques include: use of a similar technique to compensate an SSB mixer-which degrades a resultant output signal and adaptive techniques for achieving quadrature signal balance using a test tone. The adaptation procedures currently described in the prior art is not adequate for wideband LFM chirps. Furthermore, verified wideband frequency-dependent errors are not addressed by the prior art.

A quadrature modulator that allows frequency-dependent phase and amplitude corrections to be made to the output of the QDWS has been proposed. All corrections are made to analog signals after the DACs. These corrections, however, neglect problematic frequency dependent errors in the SSB mixer. Furthermore, the nature of the errors to be corrected is presumed to be predetermined—that is, no calibration procedure is discussed.

A quadrature modulator has been described that can be constructed that implements frequency dependent corrections before and at the DACs. The SSB mixer, however, is not addressed, nor is correction due to imbalance from any components or sources addressed.

Thus far, quadrature modulator prior art generally is inadequate for high-performance radar systems for one or more of the following reasons:

1) The balance corrections are relatively narrowband, and do not facilitate frequency dependent phase and amplitude corrections.

2) Adaptive schemes are not fast enough for LFM wideband chirp waveforms:

3) Imbalances within the SSB mixer itself are not addressed.

4) LO leakage (e.g., especially any frequency dependence) is not adequately addressed.

5) Where calibration schemes should be required, no calibration schemes are proposed.

The prior art leaves the skilled in the art with limited choices between narrow-band quadrature modulators that can compensate for imbalances and LO leakage using iterative techniques and wideband quadrature modulators that do not compensate for frequency dependent errors in the SSB mixer. Accordingly, there is a need for an improved wideband quadrature modulator and SSB mixer combination, which produces suitable signals for use in high fidelity radar waveform generation. Additionally, there is also a need for an operational methodology that is insensitive to the imbalances and leakage in a quadrature modulator and associated SSB mixer.

SUMMARY OF THE INVENTION

In the field of quadrature demodulators, which are used in radar receivers, U.S. Pat. No. 6,469,661, issued Oct. 22, 2002 to two of the present inventors teaches how errors due to I and Q channel imbalances in a receiver's demodulator can be mitigated by processing radar signals with pulse-to-pulse, rolling phase shifts. With this technique no calibration is required to achieve a balanced demodulator output signal. The use of quadrature modulators in radar transmitters, however, has not been described. The present inventors have discovered how use of a Quadrature DWS is viable for high-performance radar waveform synthesis. A principal advantage of the present invention is that fewer frequency multipliers are needed to generate radar waveforms of sufficient bandwidth; thereby offering the potential of cleaner waveforms (e.g., signals processing lower frequency-spurs).

Problems that generally need to be resolved with QDWS signals are those related to the generation of unwanted signal components due to energies such as LO feed-through found in the non-ideal SSB mixer and quadrature signal imbalance, as well as problem typically caused within the SSB mixer. For example, the inclusion of unwanted energy into a radar's output (e.g. SAR images) creates problems associated with the QDWS and SSB components that result in signal waveform degradation, and hence radar performance. Similar problems are encountered with other systems engaged in or requiring signal/waveform synthesis, such as: SONAR, LIDAR, medical imaging, tomography, and communications.

It is a feature of the present invention to provide an improved Quadrature Digital Waveformn Synthesizer that can further provide systems with frequency dependent corrections for quadrature imbalance and Local Oscillator (LO) feed-through.

It is another feature of the present invention to provide operational procedures to system that can enable filtration of quadrature imbalance effects from energies, such as LO feed-through energy and imbalance energy, and their effects without prior calibration or equalization.

It is yet another feature of the present invention to provide calibration procedures that can also be implemented into systems for signal synthesis.

Techniques that are herein disclosed by the present inventors to mitigate the negative effects of signal components brought on by unwanted energies such as LO feed-through and quadrature signal imbalance include the benefits of:

1) Compensating or equalizing energy imbalance by adjusting inputs (DC offsets, phase, and amplitude) to the SSB mixer so that problematic signal components aren't generated, and 2) Operating in a manner (e.g. by employing rolling phase shifts) that separates problem signals (i.e., energy) from a desired signal in Doppler to allow filtering to suppress problem energy.

In accordance with methods of the present invention, waveform generation in a system can be adjusted/corrected, for example, in a synthetic aperture radar system (SAR), where a rolling phase shift is applied to the SAR's QDWS signal where it is demodulated in a receiver; the LO feed-through energy and/or imbalance energy are then separated from a desired signal in Doppler, the separated energy is filtered from the receiver leaving the desired signal; and the separated energy in the receiver is measured to determine the degree of imbalance that is represented by it. The degree of imbalance in the system can be used to determine calibration values that can then be provided as compensation for frequency dependent errors in components, such as a SAR's QDWS and SSB mixer, affecting quadrature signal quality.

Error correction circuits can be built into the QDWS that compensate wideband frequency dependent phase and amplitude imbalances originating in the QDWS, SSB mixer, and other non-ideal components in the I and Q channels of the quadrature modulator. This can be done by predistorting the relative phase and amplitudes of the QDWS quadrature signal components by programmable frequency dependent digital perturbations into the QDWS prior to analog signal generation. LO leakage in the SSB mixer is thereafter compensated by applying DC offsets to the SSB inputs.

Frequency dependent phase and amplitude corrections and LO leakage compensation can be determined by a calibration process that involves applying pulse-to-pulse rolling phase shifts to the LFM signal within the QDWS. These phase shifts can be removed in the receiver by conjugate phase shifts. The application of these phase shifts can separate desired signals from differential-mode imbalance energy in a Doppler spectrum (the spectrum taken across the pulses). Separation allows for the unique identification, of the nature of the quadrature imbalance and LO leakage as a function of frequency for calibration purposes.

Alternatively, the present inventors teach that the calibration process can be dispensed with, where Doppler filtering can be applied to the received data to simply remove the imbalance, such as LO leakage energy, from the received signal. Calibration can thereby be rendered unnecessary, rendering any quadrature signal imbalances, or LO leakage, impotent.

BRIEF DESCRIPTION OF THE DRAWINGS

The accompanying drawings, which are incorporated in and form part of the specification, illustrate embodiments of the present invention and, together with the description, serve to explain relevant principles of the invention.

DETAILED DESCRIPTION OF THE INVENTION

Although the following provides a detailed description of the functionality and limitations that can be found in synthetic aperture radar (SAR) systems or may refer to a particular class of communications, such description is merely provided to exemplify a signaling problem commonly found in imaging, ranging and communication equipment that is capable of resolution with the present invention. Any discussion herein directed to specific radars or communications and their associated protocols should not be taken by those skilled in the art as a limitation on the applicability of the invention described herein.

The following detailed description is comprised of three main sections:

A. A model for errors and their impact on radar data, including errors due to the SSB mixer, effects of multipliers, and radar processing.

B. Mitigation techniques for non-ideal performance, including equalization techniques and operational techniques that do not require calibration.

C. Parameter estimation for equalization, including procedures for calibrating the QDWS.

A. A Model for Errors and Their Impact on Radar Data

Figure 1:
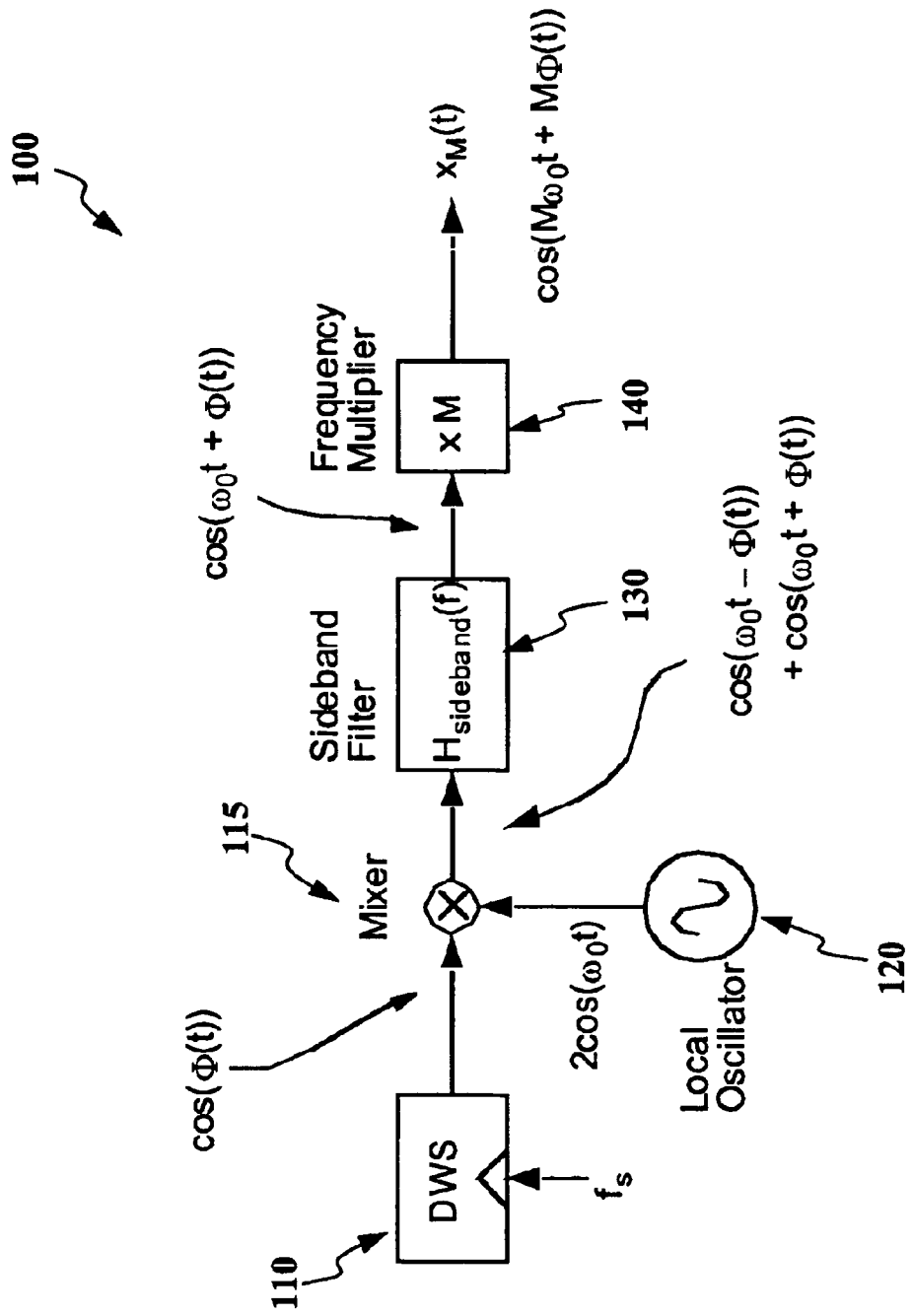
FIG. 1 provides a prior art illustration of a single-ended DWS with frequency conversion, sideband filter, and frequency multiplication components.
Figure 2:
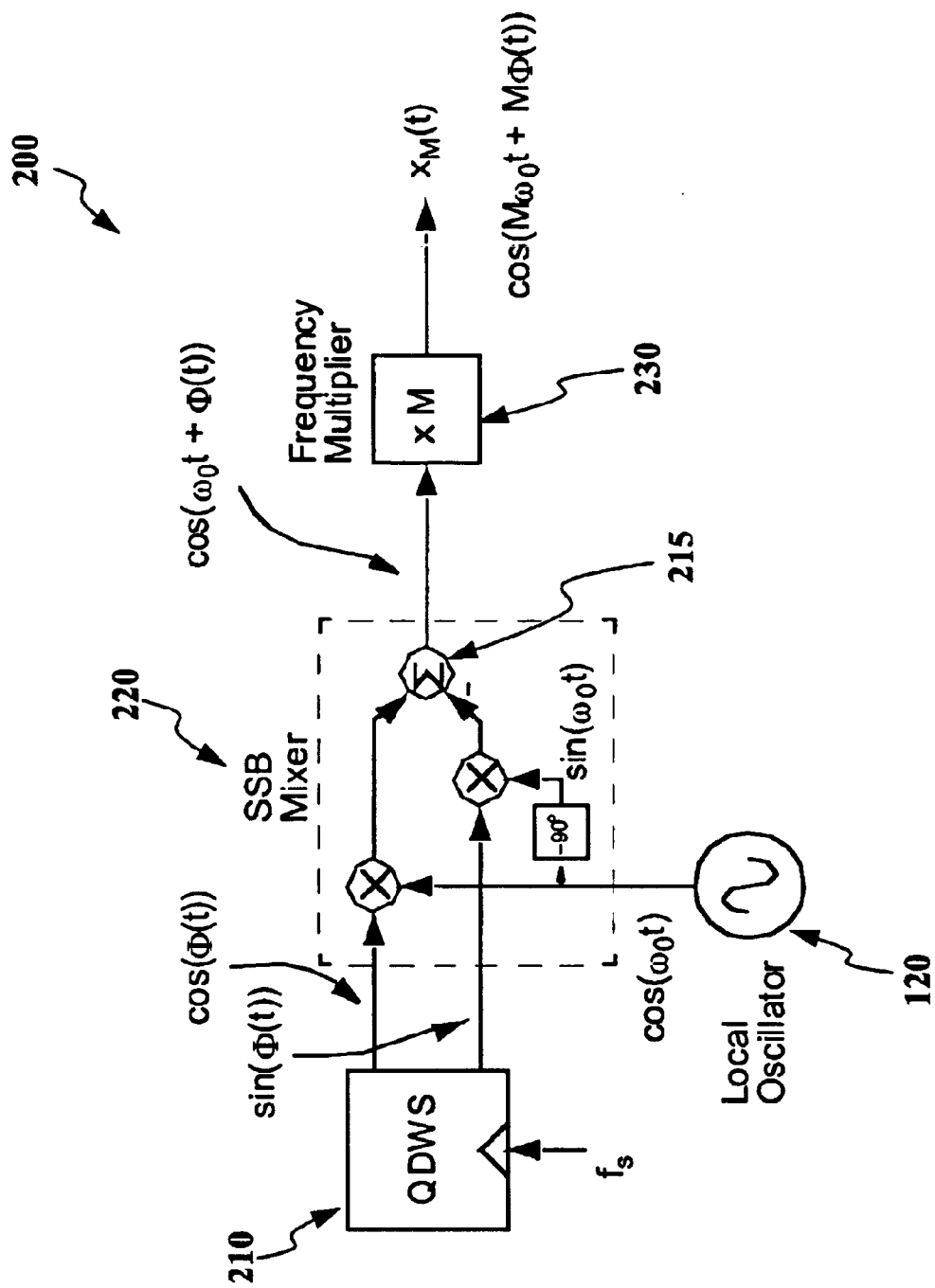
FIG. 2 provides a prior art illustration of a quadrature modulator employing a QDWS, SSB mixer, and frequency multiplier.
Figure 3:
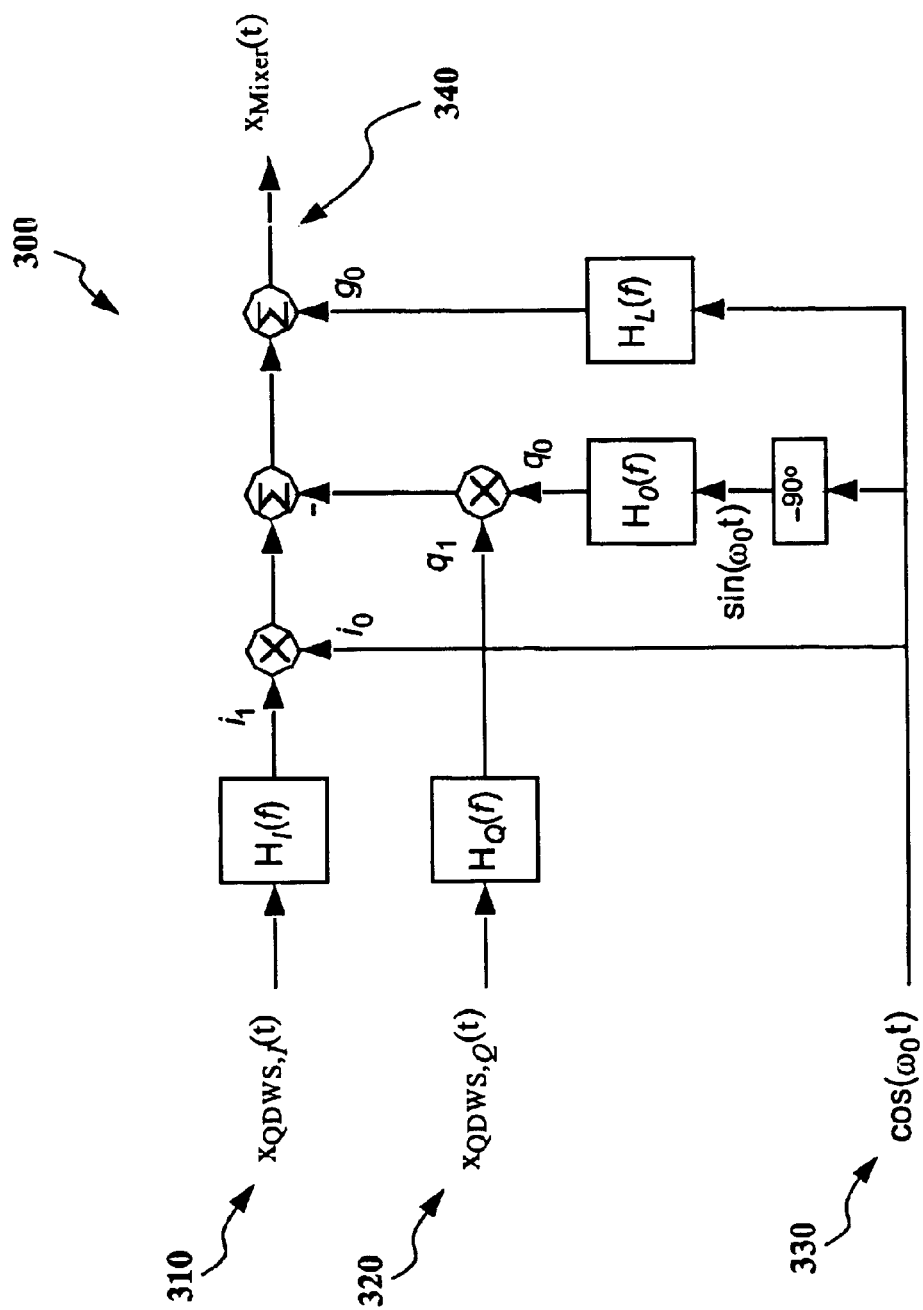
FIG. 3 illustrates a non-ideal SSB Mixer model.

FIG. 3 illustrates an architecture 300 for the non-ideal mixer. The effects of non-ideal QDWS, SSB mixer, and related components can be modeled in the following development:

Module $H_I(f)$=the application of the perturbations offered to the I channel 310, Module $H_Q(f)$=the application of the perturbations offered to the Q channel 320, Module $H'_O(f)$=the application of the perturbations offered to the LO signal 330, and Module $H_L(f)$=the transfer function of the LO leakage signal to the output 340.

When the Local Oscillator is a single-frequency sinusoid with frequency $\omega_0=2\pi f_0$, the transfer functions $H_O(f)$ and $H_L(f)$ represent constant perturbations to amplitude and phase. Consequently, for the single-frequency LO, intermediate signals can be identified as:

$i_0 = \cos(\omega_0 t)$, $q_0 = (1+k_{q0})\sin(\omega_0 t + \theta_{q0})$ and $g_0 = k_{g0}\cos(\omega_0 t + \theta_{g0})$.

For ideal quadrature input signals, $k_{q0} = k_{g0} = 0$, and $\theta_{q0} = \theta_{g0} = 0$ are desired.

Correspondingly, the transfer functions can be identified by $H_I(f)$ and $H_Q(f)$ as descriptions of frequency-dependent amplitude and phase perturbations to their respective quadrature signal inputs. These quadrature signals would have been originated by the QDWS.

Consider now the inputs to be defined as single frequency sinusoids:

$x_{QDWS,I}(t) = \cos(\omega_T t)$, and $x_{QDWS,Q}(t) = \sin(\omega_T t)$.

In a radar waveform, these signals are normally finite in duration. The envelope in the following development, however, can be ignored to simplify the discussion. Nevertheless, an underlying presumption is generally that the envelope does in fact exist, and will need to be reinserted at some point.

The corresponding intermediate signals would then be identified as $i_1 = (1+k_{i1})\cos(\omega_T t + \theta_{i1})$ and $q_1 = (1+k_{q1})\sin(\omega_T t + \theta_{q1})$.

Again, if the applied quadrature signals were ideal, $k_{i1} = k_{q1} = 0$ and $\theta_{i1} = \theta_{q1} = 0$ would be desirable. If not equal to zero, the next best condition can be that the respective parameters are equal to each other, to at least maintain balance. In any case, in a practical system we expect these perturbations to be frequency dependent.

Multiplying out the intermediate signals yields:

$$x_{Mixer}(t) = i_0 i_1 - q_0 q_1 + g_0$$
$$= \begin{pmatrix} (1+k_{i1})\cos(\omega_0 t)\cos(\omega_T t + \theta_{i1}) - \\ (1+k_{q0})(1+k_{q1})\sin(\omega_0 t + \theta_{q0})\sin(\omega_T t + \theta_{q1}) + \\ k_{g0}\cos(\omega_0 t + \theta_{g0}) \end{pmatrix}$$

It can be noted that as far as the output is concerned, a scaling error $k_{q0}$ is indistinguishable from a scaling error $k_{q1}$. That is, for every perturbation in one, a corresponding perturbation exists in the other. Consequently, no generality can be lost by assuming $k_{q0}=0$. This yields:

$$x_{Mixer}(t) = \begin{pmatrix} (1+k_{i1})\cos(\omega_0 t)\cos(\omega_T t + \theta_{i1}) - \\ (1+k_{q1})\sin(\omega_0 t + \theta_{q0})\sin(\omega_T t + \theta_{q1}) + \\ k_{g0}\cos(\omega_0 t + \theta_{g0}) \end{pmatrix}.$$

The phase perturbations $\theta_{q0}$, however, is not indistinguishable from any other term. Consequently, $\theta_{q0}=0$ cannot be assumed and must be carried along.

For small imbalances and small perturbations, the mixer output can be expanded and approximated as:

$$x_{Mixer}(t) = \begin{pmatrix} \left[(1+k_{i1}) + \frac{(k_{q1}-k_{i1})}{2}\right]\cos(\omega_0 t + \omega_T t + \theta_{i1}) - \\ \left[\frac{\theta_{q1}+\theta_{q0}-\theta_{i1}}{2}\right]\sin(\omega_0 t + \omega_T t + \theta_{i1}) - \\ \left[\frac{k_{q1}-k_{i1}}{2}\right]\cos(\omega_0 t - \omega_T t - \theta_{i1}) - \\ \left[\frac{\theta_{q1}-\theta_{q0}-\theta_{i1}}{2}\right]\sin(\omega_0 t - \omega_T t - \theta_{i1}) + \\ k_{g0}\cos(\omega_0 t + \theta_{g0}) \end{pmatrix}.$$

This signal is considered real valued. Consequently, spectral symmetry allows us to work with just the positive frequencies. Positive frequencies can be extracted and manipulated to the form:

$$x_{Mixer}(t) = \frac{1}{2}\exp j(\omega_0 t)\begin{pmatrix} \left[1+k_{i1}+\frac{\Delta k}{2}+j\left(\frac{\Delta\theta}{2}+\theta_{q0}\right)\right]\exp j(\omega_T t + \theta_{i1}) - \\ \left[\frac{\Delta k}{2}-j\frac{\Delta\theta}{2}\right]\exp - j(\omega_T t + \theta_{i1}) + k_{g0}\exp j\theta_{g0} \end{pmatrix},$$

where the imbalances have been defined as $(k_{q1}-k_{i1})=\Delta k$, and $(\theta_{q1}-\theta_{i1})=\Delta\theta$. In this form, it should be noted that the carrier is modulated by three terms, each with distinctly different characteristics.

If, ideally, no imbalances exist, this would reduce to elements of the first modulation term, that is:

$$x_{Mixer,No\ Imbalances}(t) = \frac{1}{2}[1+k_{i1}+j\theta_{q0}]\exp j(\omega_0 t + \omega_T t + \theta_{i1}).$$

No perturbations of any kind would further reduce this to:

$$x_{Mixer,Ideal}(t) = \frac{1}{2}\exp j(\omega_0 t + \omega_T t).$$

The first modulation term in $x_{Mixer}(t)$ is desired, and for small imbalances is very nearly ideal, in the relative sense.

The second modulation term is due to imbalances, and contains the conjugate, or "image" of the desired modulation.

The third term is due to local oscillator feed-through, which manifests itself as a DC modulation of the carrier, albeit with some phase shift.

The effects of imbalance to the magnitude and phase of the desired term are typically inconsequential. Consequently, the mixer output can be further simplified to:

$$x_{Mixer}(t) = \frac{1}{2}\exp j(\omega_0 t)\begin{pmatrix} [1+k_{i1}+j\theta_{q0}]\exp j(\omega_T t + \theta_{i1}) - \\ \left[\frac{\Delta k}{2}-j\frac{\Delta\theta}{2}\right]\exp - j(\omega_T t + \theta_{i1}) + \\ k_{g0}\exp j\theta_{g0} \end{pmatrix}.$$

Furthermore, if $\omega_T$ is allowed to vary with time itself, as with a LFM chirp, $\omega_T t$ can be replaced with the more general phase function $\Phi(t)$, but the fact that $\Delta k$ and $\Delta\theta$ are frequency dependent should be kept in mind. The mixer output can then be described as:

$$x_{Mixer}(t) = \begin{pmatrix} A_0 \exp j(\omega_0 t + \Phi(t) + \theta_{iI} + \varphi_0) \times \\ \begin{pmatrix} 1 + A_1 \exp - j(2\Phi(t) + 2\theta_{iI} + \varphi_1) + \\ A_L \exp - j(\Phi(t) + \theta_{iI} - \theta_{g0} - \varphi_L) \end{pmatrix} \end{pmatrix}$$

where frequency dependent terms can be defined as:

$$A_0 \exp j\varphi_0 = \left(\frac{1 + k_{iI} + j\theta_{q0}}{2}\right)$$

$$A_1 \exp - j\varphi_1 = -\frac{1}{2}\left(\frac{\Delta k - j\Delta\theta}{1 + k_{iI} + j\theta_{q0}}\right), \text{ and}$$

$$A_L \exp j\varphi_L = \left(\frac{k_{g0}}{1 + k_{iI} + j\theta_{q0}}\right).$$

The frequency multiplier output can initially take this expression to the power M, and then applies appropriate filtering. Furthermore, the non-linear compression nature of the multiplication stages typically mitigates to some extent any absolute amplitude fluctuations. For small imbalances, the net result is then reasonably modeled as:

$$x_M(t) \approx \begin{pmatrix} \exp j(M\omega_0 t + M\Phi(t) + M\theta_{iI} + M\varphi_0) \times \\ \begin{pmatrix} 1 + MA_1 \exp - j(2\Phi(t) + 2\theta_{iI} + \varphi_1) + \\ MA_L \exp - j(\Phi(t) + \theta_{iI} - \theta_{g0} - \varphi_L) \end{pmatrix} \end{pmatrix}.$$

The increase in the level of the undesired terms by a factor M is now evident. As this happens to all pre-multiplier spurs, it rationalizes a desire to minimize the multiplication factor in an overall system design.

The Radar Receiver Video Signal and Correlator Output

Figure 4:
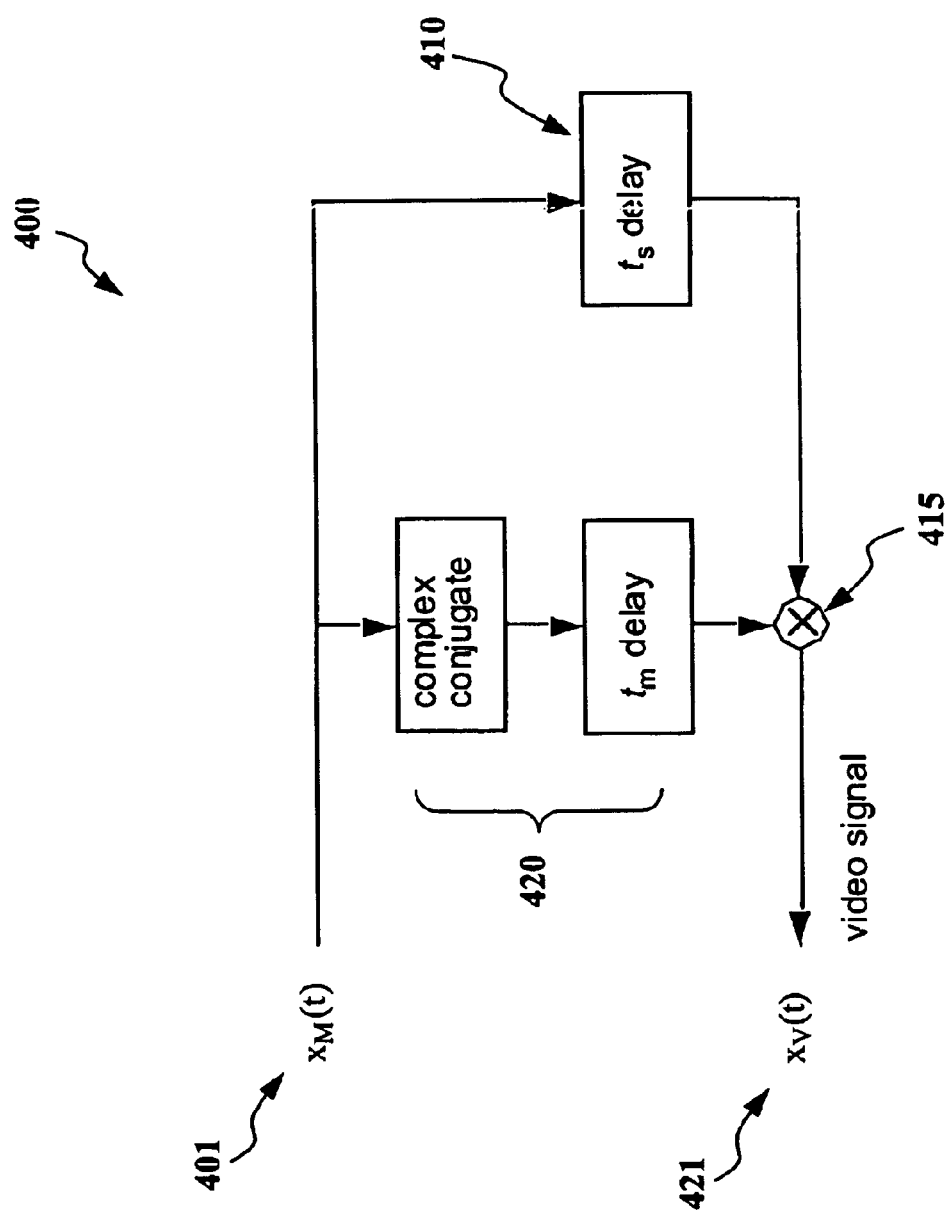
FIG. 4 illustrates a simplified radar-processing model.

For purposes of discussion, a simplified radar system 400 is illustrated in FIG. 4. Output from the multiplier 401 can be presumed to be a radar transmitted (TX) signal. The received (RX) echo signal is delayable 410 by an amount $t_s$. The receiver can mix 415 echo with a receiver local oscillator signal 420 in the form:

$$x_L(t) = x_M^*(t - t_m)$$

to form a video signal 421. The superscript * denotes complex conjugate.

The video signal can be written in a reduced form (ignoring some negligible terms) as:

$$x_V(t) = [\exp j(M\omega_0(t_m - t_s) + M(\Phi(t - t_s) - \Phi(t - t_m)) + M(\varphi_{0,s} - \varphi_{0,m})) \times$$

$$(1 + MA_{I,m} \exp j(2\Phi(t - t_m) + 2\theta_{i1,m} + \varphi_{I,m}) +$$

$$MA_{I,s} \exp - j(2\Phi(t - t_s) + 2\theta_{i1,s} + \varphi_{I,s}) +$$

$$MA_{L,m} \exp j(\Phi(t - t_m) + \theta_{i1,m} - \theta_{g0,m} - \varphi_{L,m}) +$$

$$MA_{L,s} \exp - j(\Phi(t - t_s) + \theta_{i1,s} - \theta_{g0,s} - \varphi_{L,s}))].$$

It should be noted that a number of terms are in fact frequency dependent—that is, dependent on the instantaneous frequency of either $\Phi(t - t_s)$ or $\Phi(t - t_m)$, which may in fact be different from each other at any instant in time. Consequently additional subscripts have been added herein to distinguish these terms as being influenced by which instantaneous frequency.

Strictly speaking, because pulses are being dealt with, unless $t_m = t_s$, there will typically be some non-overlap in the envelopes of the two signals. This is generally deemed normal for "stretch processing" and can be compensated by lengthening the envelopes (pulse widths) slightly beyond the interval over which data is typically collected from the video signal. Nevertheless, development can proceed as if the envelopes do in fact overlap sufficiently. The envelope of a video signal itself is adequately represented by:

$$rect\left(\frac{t - t_m}{T}\right) rect\left(\frac{t - t_s}{T}\right) \approx rect\left(\frac{t - t_m}{T}\right)$$

where T is the pulse width.

The phase term $M(\phi_{0,s} - \phi_{0,m})$ represents undesired phase variations in the desired video component, due to non-ideal signal paths. The result in SAR images, for example, is range-sidelobes, even where I and Q channels are completely balanced and LO feed-through entirely suppressed. This is precisely the term that more traditional DWS Phase-Error Correction is targeted to fix.

The integral of the video signal over time is the correlator output for the radar and describes the Impulse Response (IPR) of the radar. A correlation peak occurs when $t_m = t_s$, for which the video signal is:

$$x_V(t)|_{t_m = t_s} = (1 + 2MA_{i,s} \cos(2\Phi(t - t_s) + 2\theta_{i1,s} + \varphi_{I,s}) +$$

$$2MA_{L,s} \cos(\Phi(t - t_s) + \theta_{i1,s} - \theta_{g0,s} - \varphi_{L,s})).$$

Several observations can be noted:

The "1" describes the properly focused signal that would be sought.

The second term is the residual due to imbalance in the I and Q channels of the QDWS and SSB mixer. This signal retains time dependence, with frequency components of $2\Phi(t)$—that is, its energy is spread across twice the bandwidth of $\Phi(t)$.

The third term is the residual due to LO feed-through in the SSB mixer. This signal also retains time dependence, with frequency components of $\Phi(t)$. That is, its energy is spread across just the bandwidth of $\Phi(t)$.

The second and third terms are undesired and constitute 'multiplicative noise' in that their energy level is proportional to the desired component's response energy level. The total multiplicative noise generated relative to the signal is then:

$$MNR_{DWS} = 2M^2(A_I^2 + A_L^2)$$

where some sort of average value of $A_I$ and $A_L$ are used.

While this expression indicates the total relative undesired energy available, it fails to account for any diminishment due to video pass-band filtering, and may in some circumstances be too pessimistic. The video signal will normally have a bandwidth much reduced from that of $x_M(t)$. It can be noted, however, that undesired terms are functions whose phase are themselves time-dependent—that is, whose phase depends on delayed versions of $\Phi(t)$. Typical phase functions $\Phi(t)$ for radar are such that $\exp j\Phi(t)$ has a spectral bandwidth (as with a LFM chirp), that when appropriately multiplied, allows a desired range resolution. Consequently, if we denote $B_\Phi$ as the bandwidth of $\exp j\Phi(t)$, then energy due to I and Q channel imbalance is spread over a bandwidth $2B_\Phi$, and energy due to LO feed-through is spread over a bandwidth $B_\Phi$.

If the video signal is filtered (as it typically is) to some bandwidth $B_V$, then some of the offending undesired energy may be filtered, and rendered unavailable to the correlator output. Consequently, fractional bandwidths can be defined as:

$$\beta_I = \frac{2B_V}{2B_\Phi} = \frac{MB_V}{B_M}, \text{ and}$$

$$\beta_L = \frac{2B_V}{B_\Phi} = \frac{2MB_V}{B_M}.$$

but limited to $\beta_I \leq 1$ and $\beta_L \leq 1$, and with $B_M$ the bandwidth of the TX signal $x_M(t)$ as previously defined. With these definitions, the Multiplicative Noise Ratio (MNR) from a single return echo is limited to $$MNR_{DWS} = 2M^2 (\beta_I A_I^2 + \beta_L A_L^2).$$

As an example, given M=8, $B_V$=30 MHz, and $B_M$=1800 MHz for 0.1-m resolution, would result in is $\beta_I$=0.133, and $\beta_L$=0.267, offering 8.75 dB and 5.74 dB reductions in the MNR due to their respective sources. The reduction in MNR, however, may not always be as much as one might think. For example, given M=6, $B_V$=30 MHz, and $B_M$=180 MHz for 1-m resolution, would result in $\beta_I=\beta_L=1$ with no MNR reduction due to the reduced video filter. Note that higher multiplication factors M, and coarser resolutions render the video filter less effective in reducing MNR due to imbalance and LO feed-through.

An additional problem can be found when the bandwidth of the undesired signals extends beyond the video filter bandwidth, which also implies that radar echoes that would ordinarily be filtered by the video filter might still throw energy into the video pass band due to LO feed-through and I/Q imbalance.

In any case, for a versatile high-performance radar system, the video filter cannot be relied upon to adequately reduce the effects of imbalance and LO feed-through. Consequently, the imbalance and LO feed-through (or at least the effects thereof) generally need to be mitigated by other techniques.

B. Mitigation Techniques for Non-Ideal Performance

Techniques for dealing with problematic QDWS and SSB mixer associated I/Q channel imbalance and LO feed-through can generally fall into three broad classes:

1) Compensating or equalizing the imbalance and LO feed-through so that problematic signal components aren't generated,
2) Separating the problematic signal components from the desired signal in a manner that allows filtering to work, and
3) Dealing with the effects of the problematic signal components in the receiver.

Of course, in light of the present description, one should appreciate that various ideas can be mixed and matched from all three classes into an overall strategy to maximize system performance.

Equalization Techniques

The first mitigation technique that will now be described involves equalizing the quadrature channels. One goal of this technique is to cause the SSB mixer output to be as nearly ideal as possible. This can be achieved by pre-distorting the SSB input signal in a complementary manner from its own distortion, such that the net result is an ideal signal at the mixer output.

Figure 5:
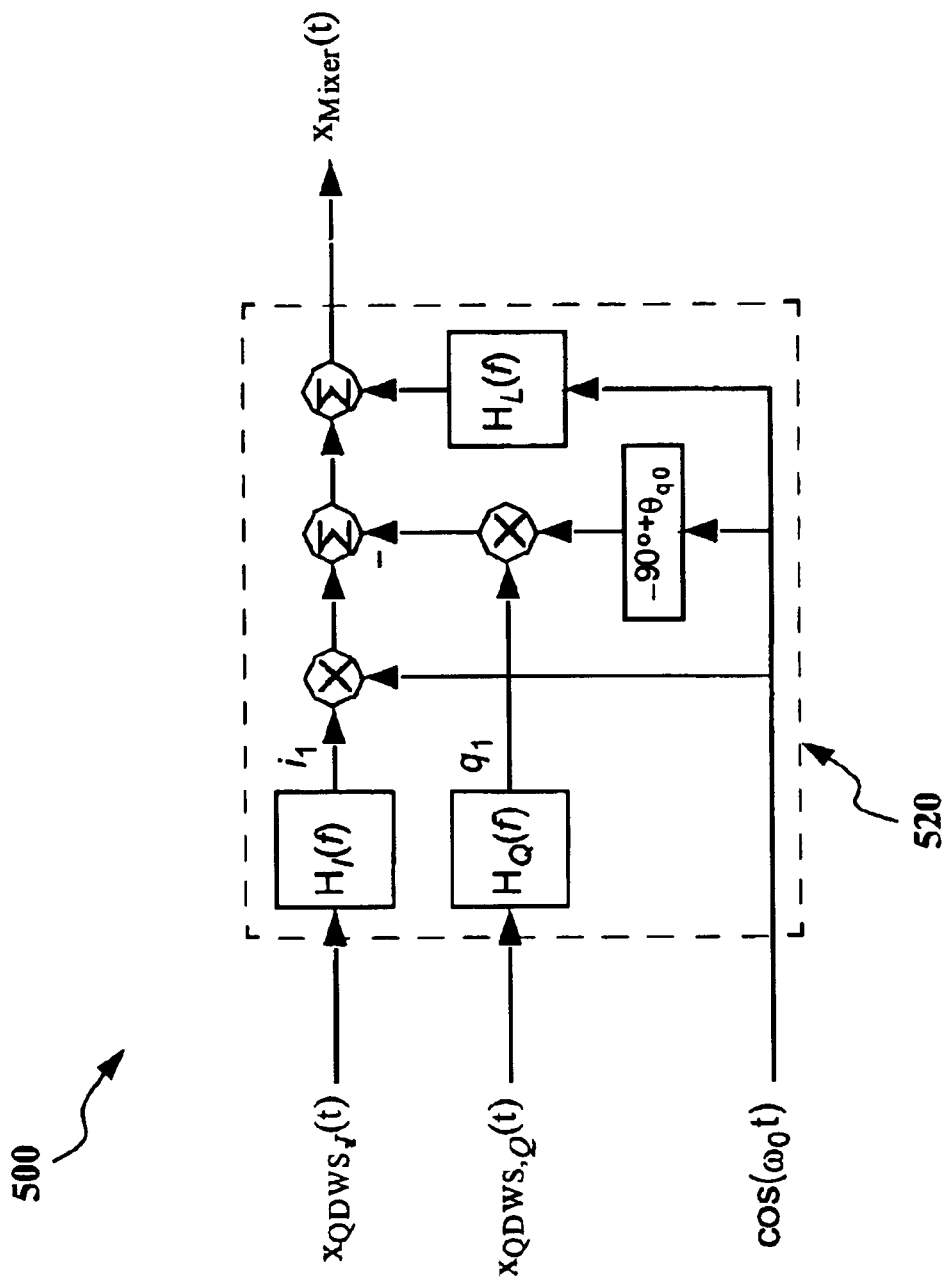
FIG. 5 illustrates a simplified non-ideal SSB Mixer model.

There are generally two distinct problem signals. The first is due to LO feed-through, and the second is due to I/Q channel imbalance. Each can be treated in order. To facilitate this development the architecture of an SSB mixer 520 itself can be desired to, as is illustrated in the system 500 of FIG. 5, where one can appreciate the mathematical model:

$$x_{Mixer}(t) =$$
$$(A_0 \exp j(\omega_0 t + \Phi(t) + \theta_{i1} + \varphi_0) \times (1 + A_I \exp - j(2\Phi(t) + 2\theta_{i1} + \varphi_i) +$$
$$A_L \exp - j(\Phi(t) + \theta_{i1} - \theta_{g0} - \varphi_L))).$$

Also, it should be noted that the effects of $k_{q0}$ have been absorbed into $k_{q1}$, and hence $A_I$ and $\phi_I$. The goal here is to make the quantities $A_I$ and $A_L$ as small as possible, ideally zero.

Compensating LO Feed-Through

The LO feed-through energy may be mitigated by forcing $A_L$=0 by appropriately modifying or selecting properties of $x_{QDWS,I}(t)$ and $x_{QDWS,Q}(t)$. Note that the LO feed-through signal can manifest itself as an equivalent DC modulation of the LO signal. By forcing input signals $x_{QDWS,I}(t)$ and $x_{QDWS,Q}(t)$ to be DC signals, with respective values:

$$x_{QDWS,I}(t) = V_{L,I}, \text{ and}$$

$$x_{QDWS,Q}(t) = V_{L,Q},$$

intermediate signals can be identified as:

$$i_1 = V_{L,I} H_I(0), \text{ and}$$

$$q_1 = V_{L,Q} H_Q(0).$$

For the DC signal input, the SSB mixer 520 output can then be described by:

$$x_{Mixer}(t) = (\lfloor V_{L,I} H_I(0) + k_{g0} \cos(\theta_{g0}) - V_{L,Q} H_Q(0) \sin(\theta_{q0}) \rfloor$$
$$\cos(\omega_0 t) - [V_{L,Q} H_Q(0) \cos(\theta_{q0}) + k_{g0} \sin(\theta_{g0})] \sin(\omega_0 t)).$$

Positive frequencies can be described by:

$$x_{Mixer}(t) = \frac{1}{2}(\lfloor V_{L,I} H_I(0) + k_{g0} \cos(\theta_{g0}) - V_{L,Q} H_Q(0) \sin(\theta_{q0}) \rfloor +$$
$$j[V_{L,Q} H_Q(0) \cos(\theta_{q0}) + k_{g0} \sin(\theta_{g0})]) \exp j(\omega_0 t).$$

The mixer output could be zeroed, thereby mitigating the effects of LO feed-through, by setting:

$$V_{L,Q} = -\left(\frac{k_{g0} \sin(\theta_{g0})}{H_Q(0) \cos(\theta_{q0})}\right), \text{ and}$$

$$V_{L,I} = -\left(\frac{k_{g0} \cos(\theta_{g0}) - V_{L,Q} H_Q(0) \sin(\theta_{q0})}{H_I(0)}\right).$$

Figure 6:
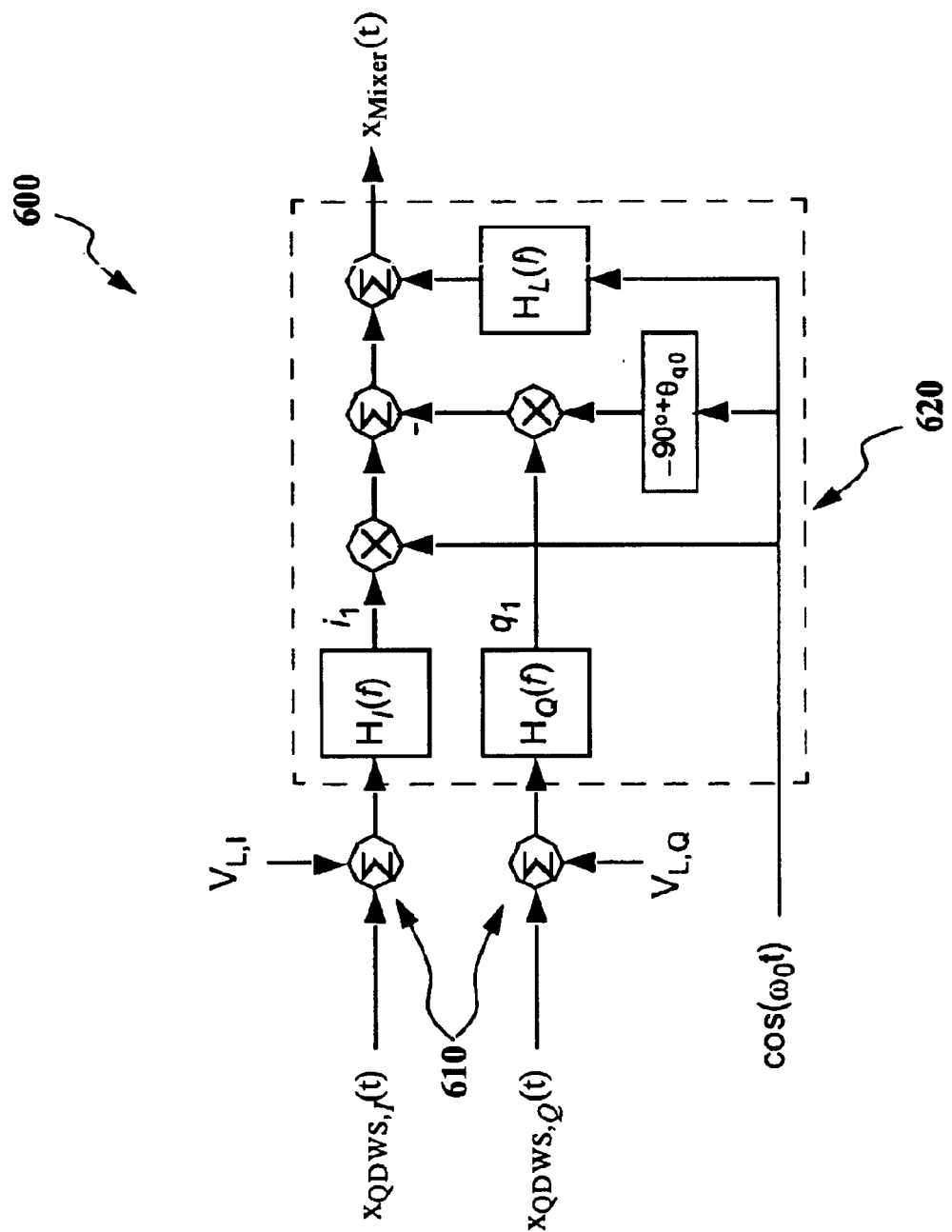
FIG. 6 illustrates a simplified non-ideal SSB Mixer model with LO feed-through compensation.

Clearly, as long as these DC values are properly input to the SSB mixer 520, the LO feed-through can be nullified, that is $A_L$=0, even in the presence of other spectral components. FIG. 6 illustrates a system 600 wherein DC biases 610 can be added to the SSB mixer 620 input to accomplish compensation. It can be noted also that $\theta^{q0} \neq 0$ can cause the appropriate value for $V_{L,I}$ to depend on the proper value for $V_{L,Q}$. If the LO feed-through amplitude and phase are dependent on the frequency of the input signal $x_{QDWS}(t)$, then the DC compensation values $V_{L,I}$ and $V_{L,Q}$ need to be dependent on the instantaneous frequency generated by a QDWS.

Balancing I/Q Channels with Error Correction

The quadrature channels can be balanced by forcing $A_I$=0 by appropriately modifying or selecting $x_{QDWS,I}(t)$ and $x_{QDWS,Q}(t)$. In this aspect of the invention the imbalance can be found in the transfer functions $H_I(f)$ and $H_Q(f)$, and LO phase imbalance term $\theta_{q0}$.

Figure 7:
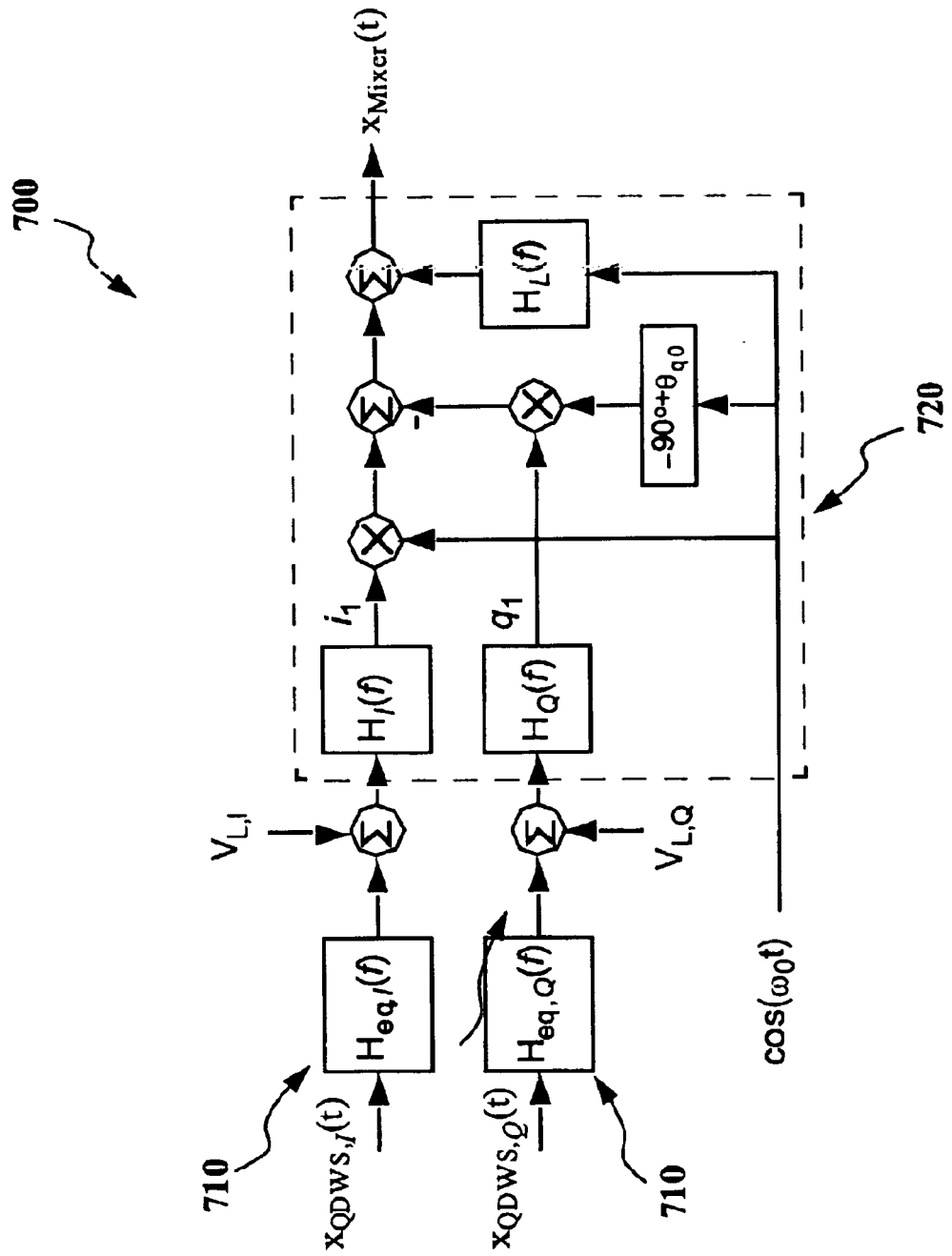
FIG. 7 illustrates a Simplified non-ideal SSB Mixer model with LO feed-through compensation and quadrature signal equalization.

To compensate for the undesired transfer functions $H_I(V)$ and $H_Q(f)$, and phase imbalance $\theta_{q0}$, equalization filters 710 can be inserted between the DWS output and the SSB mixer 720, as illustrated for the system 700 shown in FIG. 7. Alternately the behavior of the equalization filters 710 can be incorporated into the QDWS itself by suitably perturbing the quadrature signals.

A model for the input signals can be returned to, namely:

$$x_{QDWS,I}(t) = \cos(\Phi(t)), \text{ and}$$

$$x_{QDWS,Q}(t) = \sin(\Phi(t))$$

and the limiting envelope rect(t/T) can continue to be ignored. In the absence of the equalization filters 720 (and ignoring the DC offset inputs), we recall the intermediate signals to be:

$$i_1 = (1+k_{i1})\cos(\Phi(t)+\theta_{i1}), \text{ and}$$

$$q_1 = (1+k_{q1})\sin(\Phi(t)+\theta_{q1})$$

where perturbation parameters $k_{i1}$, $\theta_{i1}$, $k_{q1}$, and $\theta_{q1}$ embody the effects of $H_I(f)$ and $H_Q(f)$, and depend on (may vary with) the instantaneous frequency $\omega_T = d\Phi(t)/dt$.

The effects of the equalization filters 710 can now be added, and it should be noted that these transfer functions are also just descriptions of amplitude and phase variations as a function of frequency. Consequently the effects of the equalization filters 710 can be mathematically modeled as:

$$i_1 = (1+k_{i1,Heq})(1+k_{i1})\cos(\Phi(t)+\theta_{i1}+\theta_{i1,Heq}), \text{ and}$$

$$q_1 = (1+k_{q1,Heq})(1+k_{q1})\sin(\Phi(t)+\theta_{q1}+\theta_{q1,Heq})$$

where $k_{i1,Heq}$, $\theta_{i1,Heq}$, $k_{q1,Heq}$ and $\theta_{q1,Heq}$ describe the effects of the equalization filters 710 at frequency $\omega_T$.

For the subsequent development equivalent parameters can now simply be defined as:

$$(1+k_{i1,eq}) = (1+k_{i1,Heq})(1+k_{i1}),$$

$$\theta_{i1,eq} = \theta_{i1} + \theta_{i1,Heq},$$

$$(1+k_{q1,eq}) = (1+k_{q1,Heq})(1+k_{q1}), \text{ and}$$

$$\theta_{q1,eq} = \theta_{q1} + \theta_{q1,Heq}.$$

The mixer 720 output without any LO feed-through, can also be described by:

$$x_{Mixer}(t) = \begin{pmatrix} A_0 \exp j(\omega_0 t + \Phi(t) + \theta_{i1,eq} + \varphi_0) \times \\ \left(1 + \begin{pmatrix} \\ A_1 \exp - j(2\Phi(t) + 2\theta_{i1,eq} + \varphi_1) \end{pmatrix}\right) \end{pmatrix}.$$

with the grouped parameters now defined by:

$$A_0 \exp j\varphi_0 = \left(\frac{1+k_{i1,eq}+j\theta_{q0}}{2}\right),$$

$$A_1 \exp - j\varphi_1 = -\frac{1}{2}\left(\frac{\Delta k - j\Delta\theta}{1+k_{i1,el}+j\theta_{q0}}\right),$$

where now $\Delta k = (k_{q1,eq} - k_{i1,eq})$, and $\Delta\theta = (\theta_{q1,eq} - \theta_{i1,eq} - \theta_{q0})$.

To force $A_1 = 0$, $\Delta k = \Delta\theta = 0$ is required and further requires:

$$k_{q1,Heq} = (1+k_{i1,Heq})\frac{(1+k_{i1})}{(1+k_{q1})} - 1, \text{ and}$$

$$\theta_{q1,Heq} = \theta_{i1} - \theta_{q1} + \theta_{i1,Heq} + \theta_{q0}.$$

$k_{i1,Heq} = \theta_{i1,Heq} = 0$ can be arbitrarily set and still maintain complete balance, or complete equalization can be forced by setting:

$$k_{i1,Heq} = \frac{1}{(1+k_{i1})} - 1, \text{ and}$$

This would force $k_{q1,eq} = k_{i1,eq} = 0$, and $\theta_{i1,eq} = (\theta_{q1,eq} - \theta_{q0}) = 0$.

Figure 8:
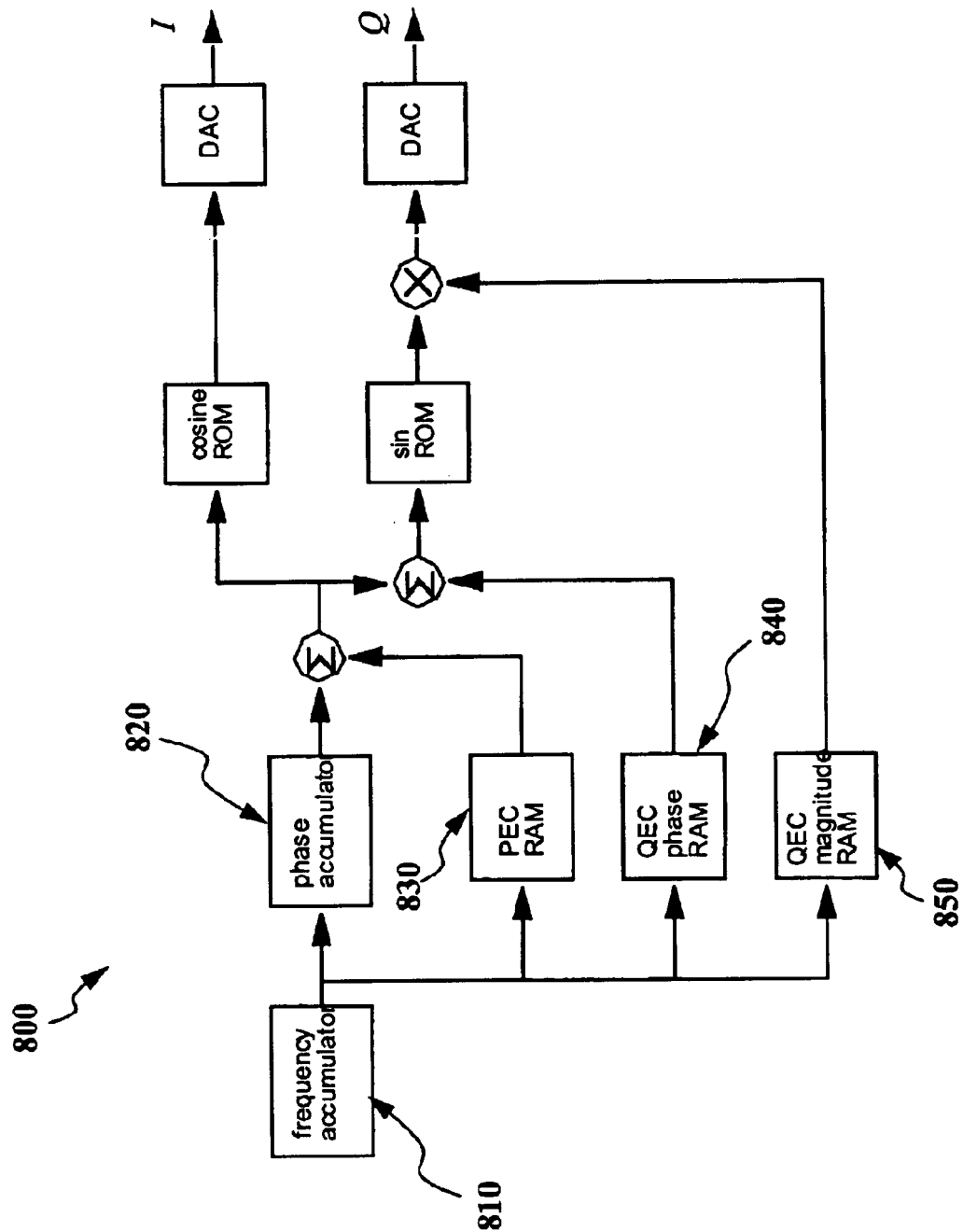
FIG. 8 illustrates a LFM chirp generation using QECDWS. The PEC RAM contains phase corrections common to both I and Q channels. The QEC phase RAM corrects phase differences, and the QEC magnitude RAM corrects amplitude differences.

Equalization can therefore be accomplished for LFM chirp generation by implementing the required amplitude and phase corrections of the equalization filters 710 directly into the QDWS itself. This scheme would produce $x_{QDWS,I}(t)$ and $x_{QDWS,Q}(t)$ with the error corrections already "built in", and can be referred to as Quadrature Error Corrected DWS (QECDWS). A block diagram detailing how this might be incorporated is illustrated for the system architecture 800 shown in FIG. 8.

In the system architecture 800, the frequency accumulator 810 and phase accumulator 820 constitute the double accumulator architecture for LFM chirp generation. The PEC RAM 830 applies frequency dependent common-mode phase error corrections of the type previously discussed. The QEC Phase RAM 840 applies frequency dependent corrections $\theta_{q1,Heq} = \theta_{i1} - \theta_{q1} + \theta_{i1,Heq} + \theta_{q0}$. The QEC magnitude RAM 850 applies frequency dependent corrections $$k_{q1,Heq} = (1+k_{i1,Heq})\frac{(1+k_{i1})}{(1+k_{q1})} - 1.$$

By applying both LO feed-through compensation and quadrature channel balancing simultaneously, the mixer output can be described by the more desirable model:

$$X_{Mixer,NoImbalance}(t) = A_0 \exp j(\omega_0 t + \Phi(t) + \theta_{i1,eq} + \varphi_0).$$

Consequently, the imbalances due to a non-ideal SSB mixer have been compensated by corrections within the QDWS.

A procedure for determining the exact required $V_{L,I}$, $V_{L,Q}$, $H_{eq,I}(f)$, and $H_{eq,Q}(f)$ based on observable and measurable parameters can still be considered problematic. A solution to such an issue can be facilitated by procedures and techniques that allow independent measurement of errors due to LO feed-through and quadrature channel imbalance.

Separating Problem Signals from the Desired Signal

Techniques are herein presented to separate the desired signal from the undesired problem signals in a manner that allows spectral filtering to select signal components of interest. As in the previous section, one can begin with techniques for mitigating LO feed-through and follow with I/Q imbalance.

Separating LO Feed-Through in Frequency

Figure 9:
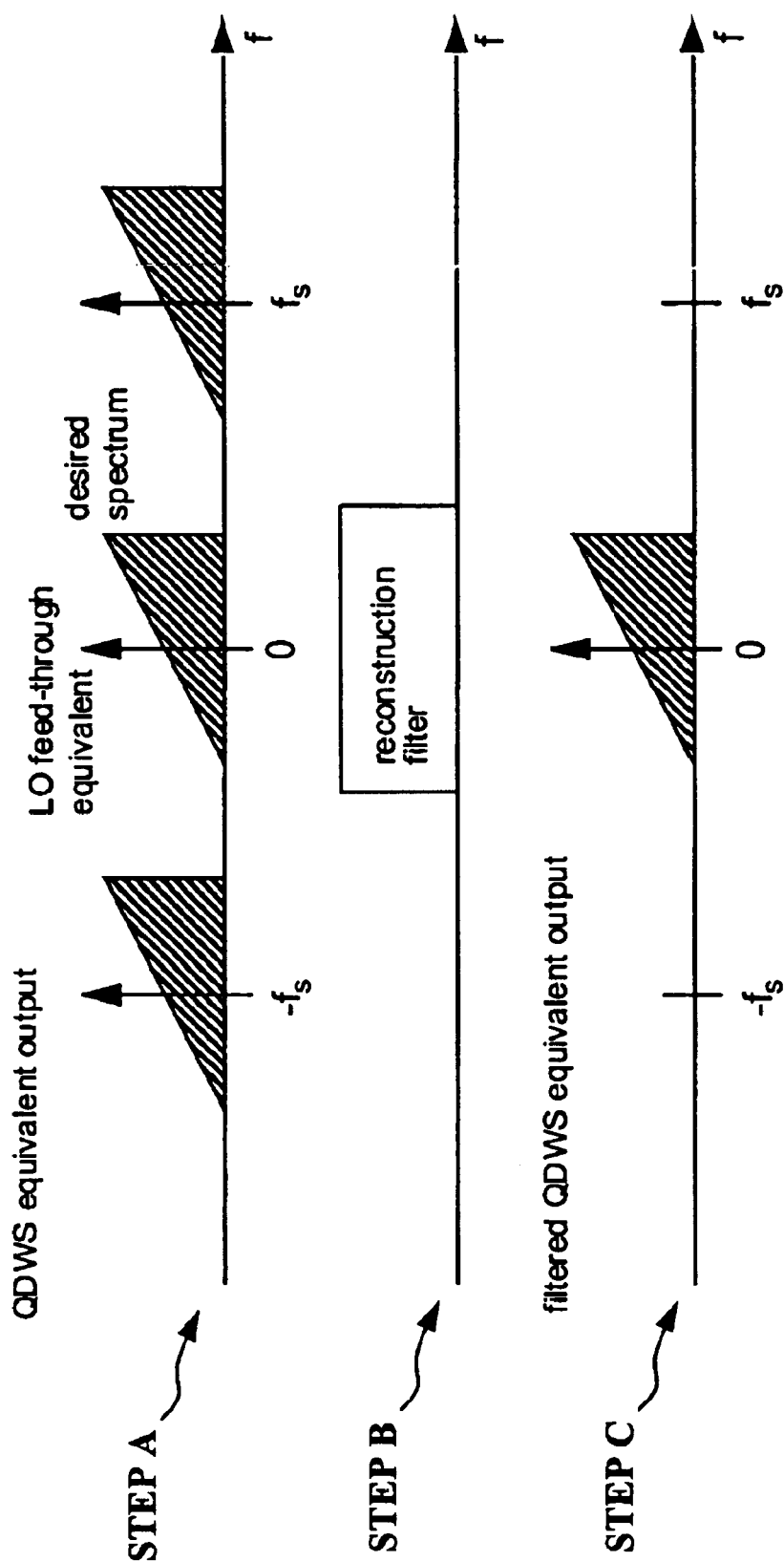
FIG. 9 illustrates a Frequency representation of a conventional technique for generating QDWS output.

A technique is now presented herein that separates desired signal components from undesired LO feed-through signals. Conventional techniques tend to treat QDWS output signals as occupying a significant majority of the spectrum between $-f_s/2$ and $f_s/2$. This is illustrated graphically in Step A of FIG. 9. The baseband signal is then filtered and applied to the SSB mixer as shown at Step B. The problem now is that the LO feed-through is equivalent to a DC signal added to QDWS output. As such, it exists in the center of the output signal spectrum as shown in Step C.

Figure 10:
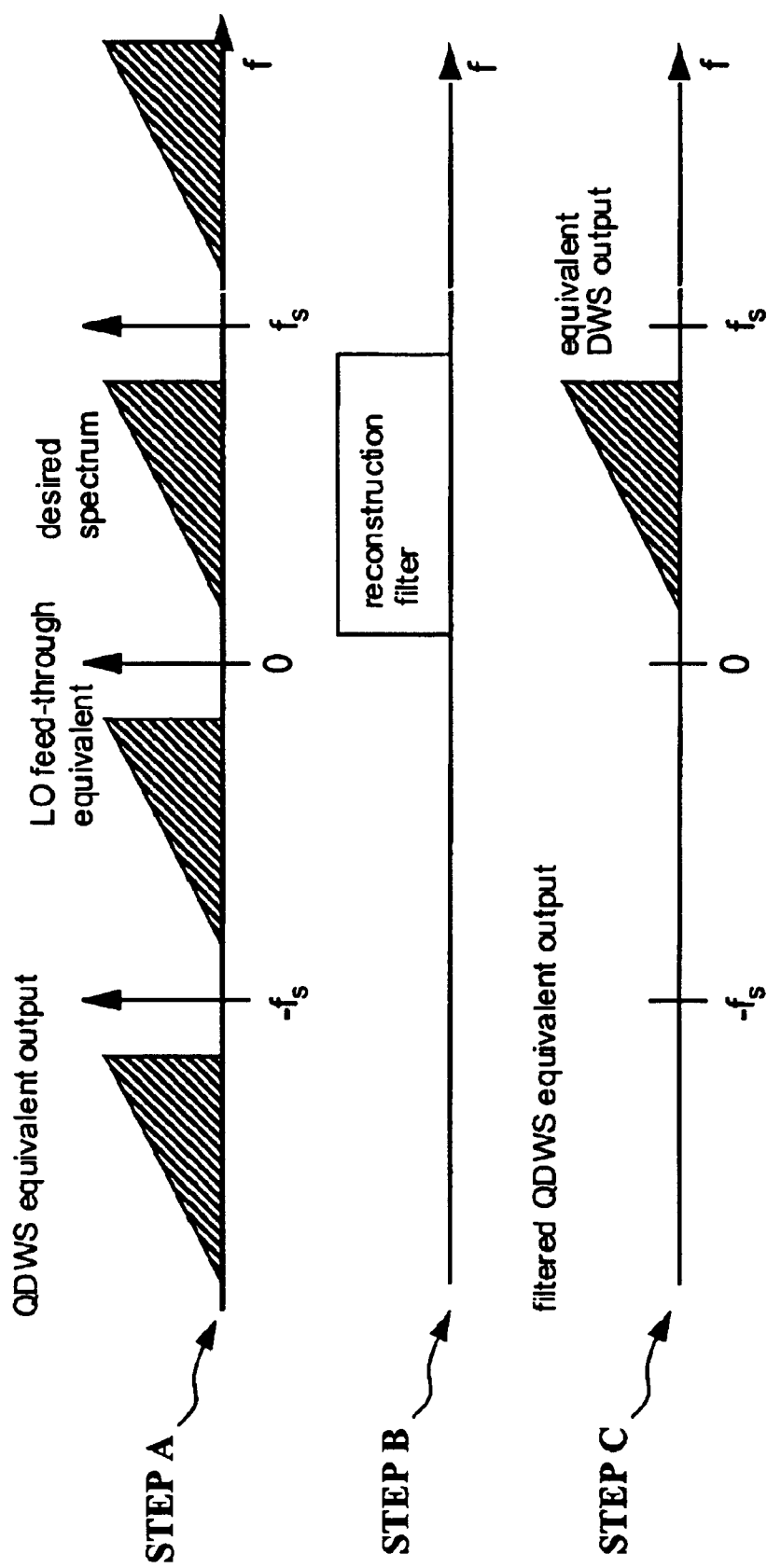
FIG. 10 illustrates the generation of QDWS output with frequency bias.

Notch-filtering the LO feed-through at the output of the SSB mixer would filter a portion of the desired signal, thereby degrading the desired signal, and ultimately the radar data collected by the receiver. This process and result is generally undesirable. A frequency bias, however, can be added to the desired signal during its generation by forcing its spectrum to lie between 0 and $f_s$, as is illustrated at Step A in FIG. 10. This would allow frequency separation between the desired spectrum and the LO feed-through equivalent, thereby offering an opportunity to filter the problematic signal without adversely affecting the desired signal. A principal difficulty with this approach, however, is that the reconstruction filter as proposed in FIG. 10 is one-sided, that is, it exists for positive frequencies only as shown at Step C, and consequently is unrealizable. This results in a slightly more elaborate scheme being required.

Figure 11:
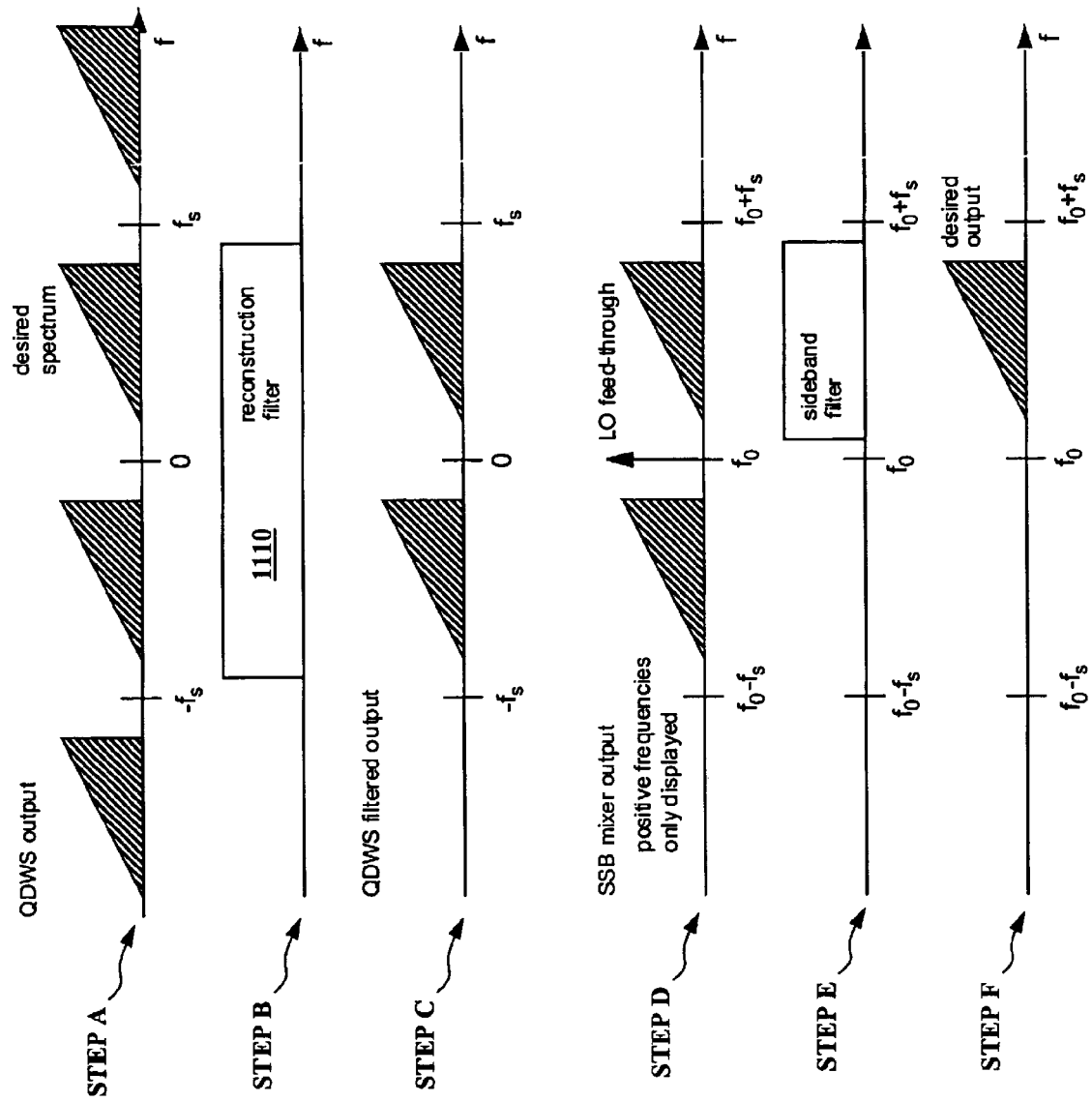
FIG. 11 illustrates the generation of QDWS output with frequency bias.

FIG. 11 depicts an improved scheme for separating LO feed-through from the desired signal. In this scheme, all filters are real-valued. A signal is generated with its spectrum between 0 and $f_s$. It is initially filtered by a realizable reconstruction filter 1110 and then modulated upwards in frequency to some intermediate carrier frequency. The extra sideband can be filtered using a sideband filter 1120, leaving the desired sideband. This is considered by the inventors to be a more complicated procedure.

A remaining concern is whether the sideband filter 1120 can suitably reject the LO feed-through and lower-sideband duplicate chirp. Nevertheless, spectral separation of the desired signal from the LO feed-through can be achieved.

Another problem with this approach stems from the model presumed for the QDWS output spectrum. As is well known, sampled signals have their spectrum perfectly replicated around integer multiples of the sampling frequency $f_s$, over all frequencies. Perfect replication over all frequencies, however, presumes that a train of ideal impulses each with area proportionate to the instantaneous signal value describes the samples. Mathematically this is described by:

$$x_{QDWS}(t) = \sum_n x_{QDWS,ideal}(t)\delta(t - n/f_s)$$

where $x_{QDWS,ideal}(t)$ is the desired signal to be reconstructed, and $\delta(t)$ is a unit-area impulse function.

Real Digital to Analog Converter (DAC) components, however, do not generate ideal impulses, but rather generate voltage values that are held until the next sample is clocked in. This constitutes an implicit filtering operation. Mathematically this is described more accurately by the convolution:

$$x_{QDWS}(t) = \left(\sum_n x_{QDWS,ideal}(t)\delta(t - n/f_s)\right) * rect(f_s t).$$

This, of course, implies that the spectrum is weighted (multiplied) by a sinc function of the form:

$$\text{Spectral weighting} = \frac{1}{f_s}\text{sinc}\left(\frac{f}{f_s}\right)$$

where:

$$\text{sinc}(f) = \frac{\sin(\pi f)}{\pi f}.$$

Figure 12:
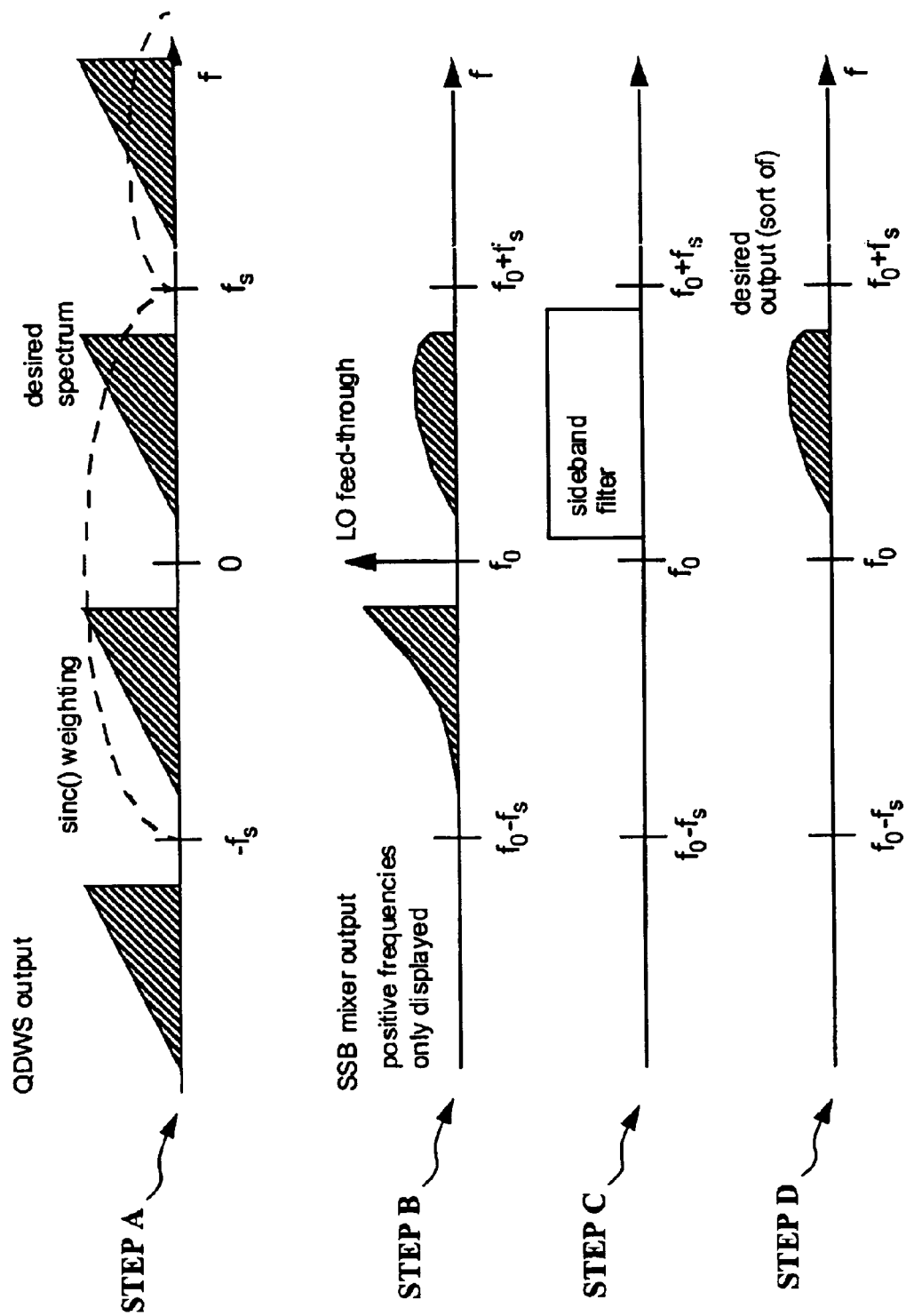
FIG. 12 illustrates filtering effects of non-ideal DAC.

FIG. 12 illustrates how the sinc weighting might affect QDWS outputs. Note that for $f=0.9\ f_s$ the signal attenuation by the implicit filtering is almost 20 dB. The remedy for this would be to equalize what amounts to an effective sinc function filter shape that is applied to the QDWS output. In a manner similar to the QECDWS scheme herein described, amplitude pre-distortions vs. frequency might be made during waveform synthesis such that the desired portion of the reconstructed output of the QDWS exhibits lesser (and preferably no) rolloff with frequency. Some rolloff can in fact be tolerated in LFM chirp waveforms, as downstream components, especially in the multiplier circuits, which will tend to flatten the response anyway.

Separating LO Feed-Through in Doppler

The detailed description up to now has presumed that one wants to correct the signal for each and every pulse, independent of other pulses. Radar systems, however, typically process multiple pulses to arrive at a final signal-processing product. For example, a typical high-performance Synthetic Aperture Radar (SAR) system might process several tens of thousands of pulses to form a single image. Combining returns from multiple pulses in a coherent fashion is termed Doppler processing. An adequate presumption for subsequent discussion is that a Doppler frequency shift manifests itself primarily as a pulse-to-pulse phase shift of a signal. The Doppler characteristics of a radar echo can be manipulated by artificially applying pulse-to-pulse phase shifts in some desirable manner. The LO feed-through can be separated from the desired signal in its Doppler characteristics.

Consider a receiver video signal model exhibiting only LO feed-through and no I/Q imbalance, that is:

$$x_V(t) = \begin{bmatrix} \exp j(M\omega_0(t_m - t_s) + M(\Phi(t - t_s) - \\ \Phi(t - t_m)) + M(\varphi_{0,s} - \varphi_{0,m})) \times \\ \left(\begin{matrix} 1 + \\ MA_{L,m}\exp j(\Phi(t - t_m) + \theta_{iI,m} - \theta_{gO,m} - \varphi_{L,m}) + \\ MA_{L,s}\exp - j(\Phi(t - t_s) + \theta_{iI,s} - \theta_{gO,s} - \varphi_{L,s}) \end{matrix}\right) \end{bmatrix}.$$

A pulse-to-pulse phase shift of $\pi$ radians can now be added per pulse, such that $\Phi(t) \rightarrow (\Phi(t)+n\pi)$ is replaced where n is the pulse number index. This effectively alters the reference phase between values of 0 and $\pi$ on a pulse-to-pulse basis. By noting that $\exp jn\pi = \exp -jn\pi$ the video signal then becomes:

$$x_V(t) = \begin{bmatrix} \exp j(M\omega_0(t_m - t_s) + M(\Phi(t - t_s) - \\ \Phi(t - t_m)) + M(\varphi_{0,s} - \varphi_{0,m})) \times \\ \left(1 + \exp j(n\pi)\begin{pmatrix} MA_{L,m}\exp j(\Phi(t - t_m) + \theta_{iI,m} - \theta_{gO,m} - \varphi_{L,m}) + \\ MA_{L,s}\exp - j(\Phi(t - t_s) + \theta_{iI,s} - \theta_{gO,s} - \varphi_{L,s}) \end{pmatrix}\right) \end{bmatrix}.$$

The result is that the LO feed-through term is modulated by $\exp jn\pi$, but the desired energy is not. That is, the problematic LO feed-through signal has been separated in Doppler from the desired signal.

Figure 13:
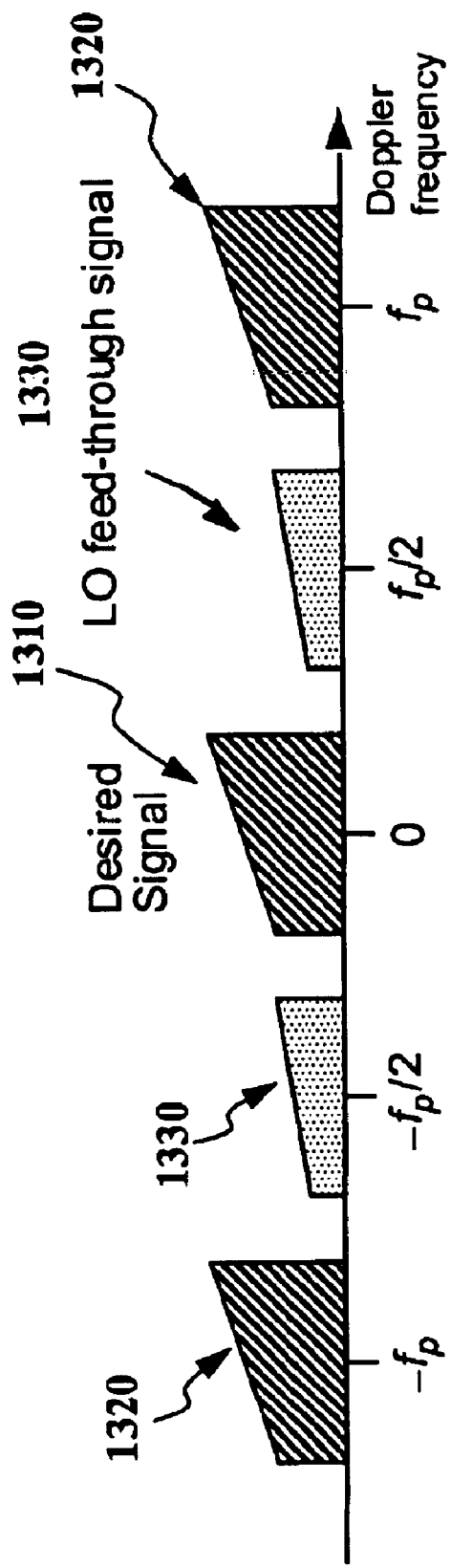
FIG. 13 illustrates Doppler separation of LO feed-through signal from desired signal using $\pi$ rad./pulse modulation of the QDWS phase.

FIG. 13 illustrates how, if the desired signal 1310 is Doppler band-limited and centered around a zero Doppler frequency, and if the radar Pulse Repetition Frequency (PRF) 1320 is defined as $f_p$, then the problematic LO feed-through signal will also be Doppler band-limited but will instead be centered around $f_p/2$. Doppler filtering can then quite effectively mitigate the unwanted energy.

The PRF should be high enough so that the LO feedthrough Doppler spectrum 1330 does not overlap that portion of the desired signal Doppler spectrum of interest. If the Doppler spectrum is limited to a bandwidth $B_{Doppler}$, then it can be guaranteed by insisting $f_p \geq 2B_{Doppler}$.

Figure 14:
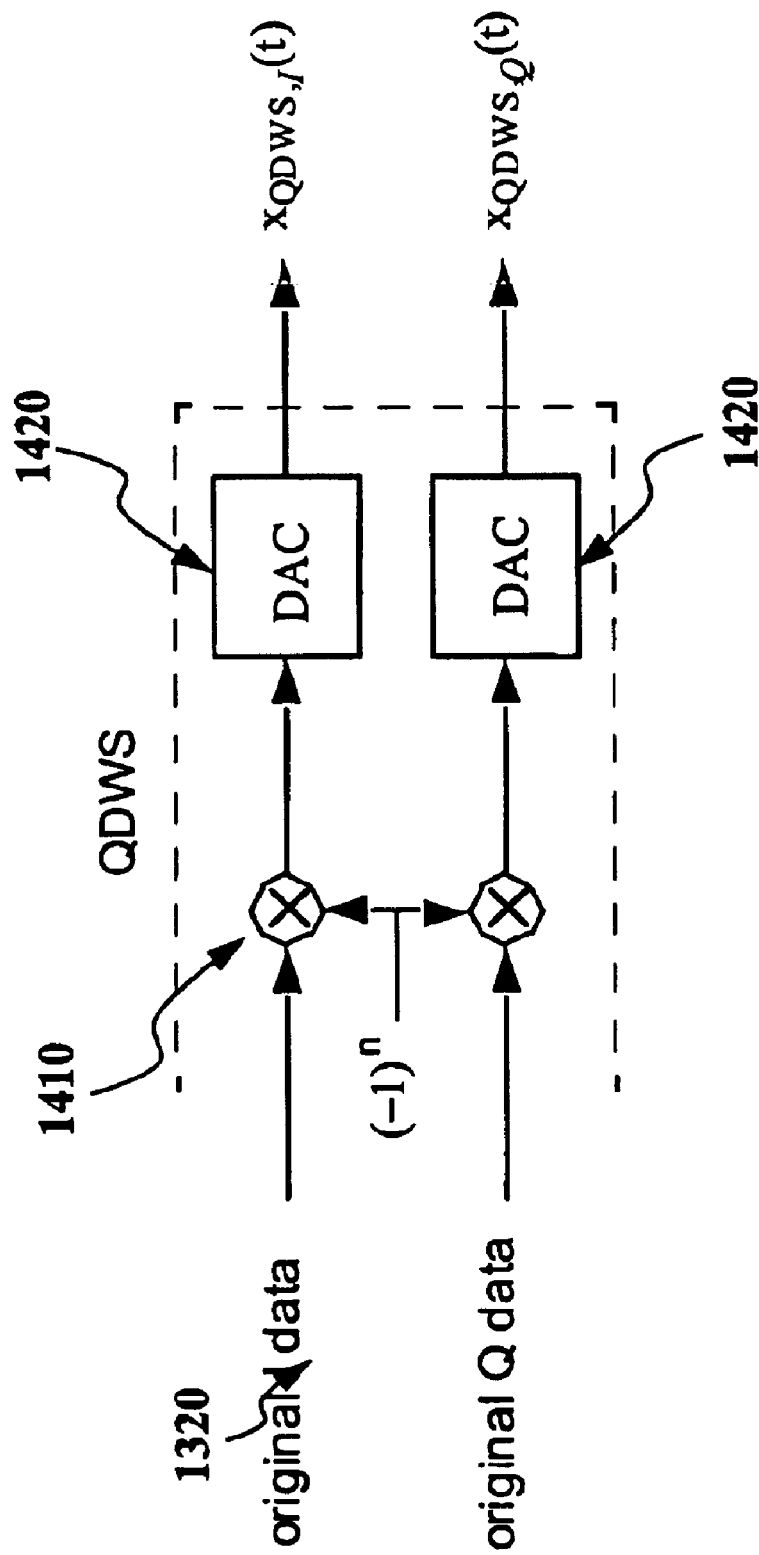
FIG. 14 illustrates a method for generating $\pi$ rad./pulse modulation of the QDWS phase.

Referring to FIG. 14, the requisite $0/\pi$ phase modulation can be accomplished by inserting the appropriate 0 or $\pi$ radian phase shift into the output of the QDWS 1410, prior to the DACs 1420, while the signal is still just data. It should be noted that a $\pi$ radian phase shift is just multiplication by $-1$. Consequently, $\exp j(n\pi)=(-1)^n$.

An important point that should not be lost is that a particular index n value is for a transmitted (TX) pulse and demodulating receiver (RX) pulse pair. Any pulse formed to assist RX demodulation needs to remain coherent with (i.e. the same pulse-to-pulse phase relationship to) the corresponding TX signal. That is, n increments on TX only, and remains unchanged for any RX pulses generated.

Separating I/Q Imbalance Energy

A separating technique can be used to also mitigate I/Q imbalance. Simple $0/\pi$ modulation, however, is inadequate for this task. Nevertheless, the principle that appropriate phase shifts in the QDWS on a pulse- to-pulse basis can separate problem signals from the desired signal in Doppler is still sound.

Consider again the video signal, but now including the effects of I/Q imbalance as well as LO feed-through:

$$x_V(t) = \begin{bmatrix} \exp j(M\omega_0(t_m-t_s) + M(\Phi(t-t_s)-\Phi(t-t_m)) + M(\varphi_{0,s}-\varphi_{0,m})) \\ \times \begin{pmatrix} 1 + \\ MA_{I,m}\exp j(2\Phi(t-t_m) + 2\theta_{iI,m} + \varphi_{I,m}) + \\ MA_{I,s}\exp - j(2\Phi(t-t_s) + 2\theta_{iI,s} + \varphi_{I,s}) + \\ MA_{L,m}\exp j(\Phi(t-t_m) + \theta_{iI,m} - \theta_{gO,m} - \varphi_{L,m}) + \\ MA_{L,s}\exp - j(\Phi(t-t_s) + \theta_{iI,s} - \theta_{gO,s} - \varphi_{L,s}) \end{pmatrix} \end{bmatrix}.$$

Now add a pulse-to-pulse phase shift of some fixed amount, such that $\Phi(t) \to (\Phi(t)+n\Delta\phi)$ is replaced where $\Delta\phi$ is the pulse-to-pulse phase shift, and n is the pulse index number (incrementing by one with each new transmitted pulse). Consequently, $x_{QDWS}(t)$ contains a rolling phase shift that rolls at a rate $\Delta\phi$ radians per pulse. The video signal then becomes:

$$x_V(t) = \begin{bmatrix} \exp j(M\omega_0(t_m-t_s) + M(\Phi(t-t_s)-\Phi(t-t_m)) + M(\varphi_{0,s}-\varphi_{0,m})) \\ \times \begin{pmatrix} 1 + \\ \exp j(2n\Delta\phi)[MA_{I,m}\exp j(2\Phi(t-t_m) + 2\theta_{iI,m} + \varphi_{I,m})] + \\ \exp - j(2n\Delta\phi)[MA_{I,s}\exp - j(2\Phi(t-t_s) + 2\theta_{iI,s} + \varphi_{I,s})] + \\ \exp j(n\Delta\phi)[MA_{L,m}\exp j(\Phi(t-t_m) + \theta_{iI,m} - \theta_{gO,m} - \varphi_{L,m})] + \\ \exp - j(n\Delta\phi)[MA_{L,s}\exp - j(\Phi(t-t_m) + \theta_{iI,s} - \theta_{gO,s} - \varphi_{L,s})] \end{pmatrix} \end{bmatrix}.$$

Figure 15:
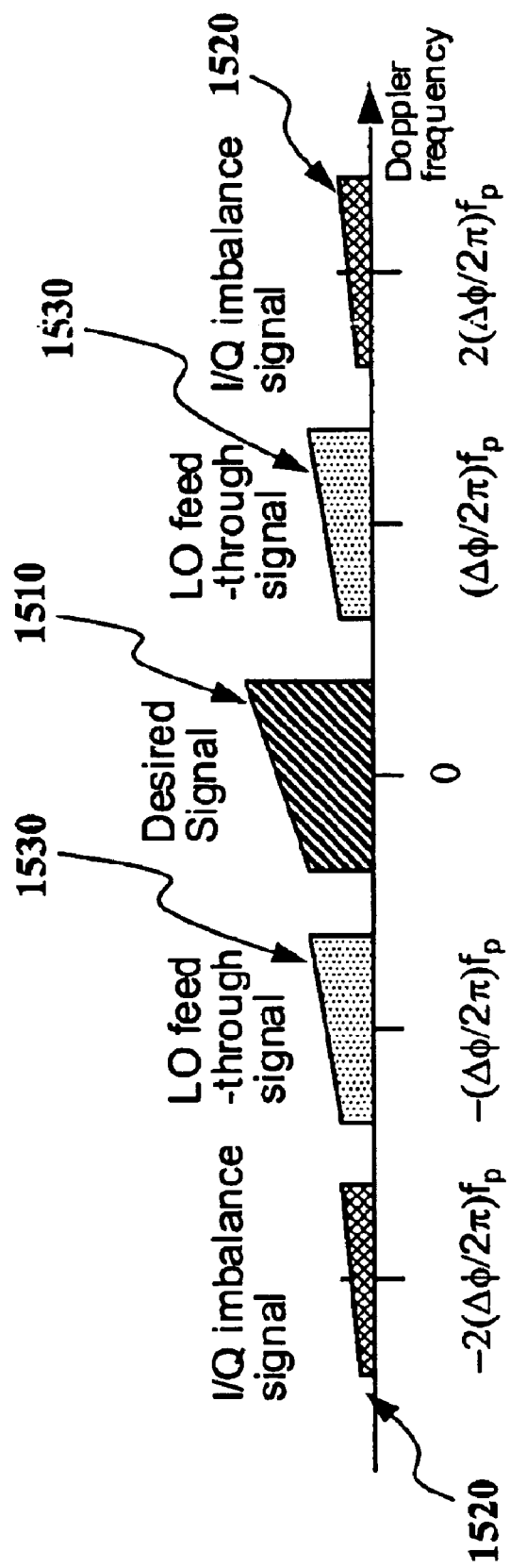
FIG. 15 illustrates Doppler separation of LO feed-through signal and I/Q imbalance signal from desired signal using rolling phase shift of the QDWS phase.

A notional video Doppler spectrum is illustrated in FIG. 15. As with the $0/\pi$ modulation described earlier, problem terms are modulated in Doppler, whereas the desired signal 1510 remains unaffected. Note also that the LO feed-through spectrum 1530 and the I/Q imbalance spectrum 1520 are separated from each other.

Figure 16:
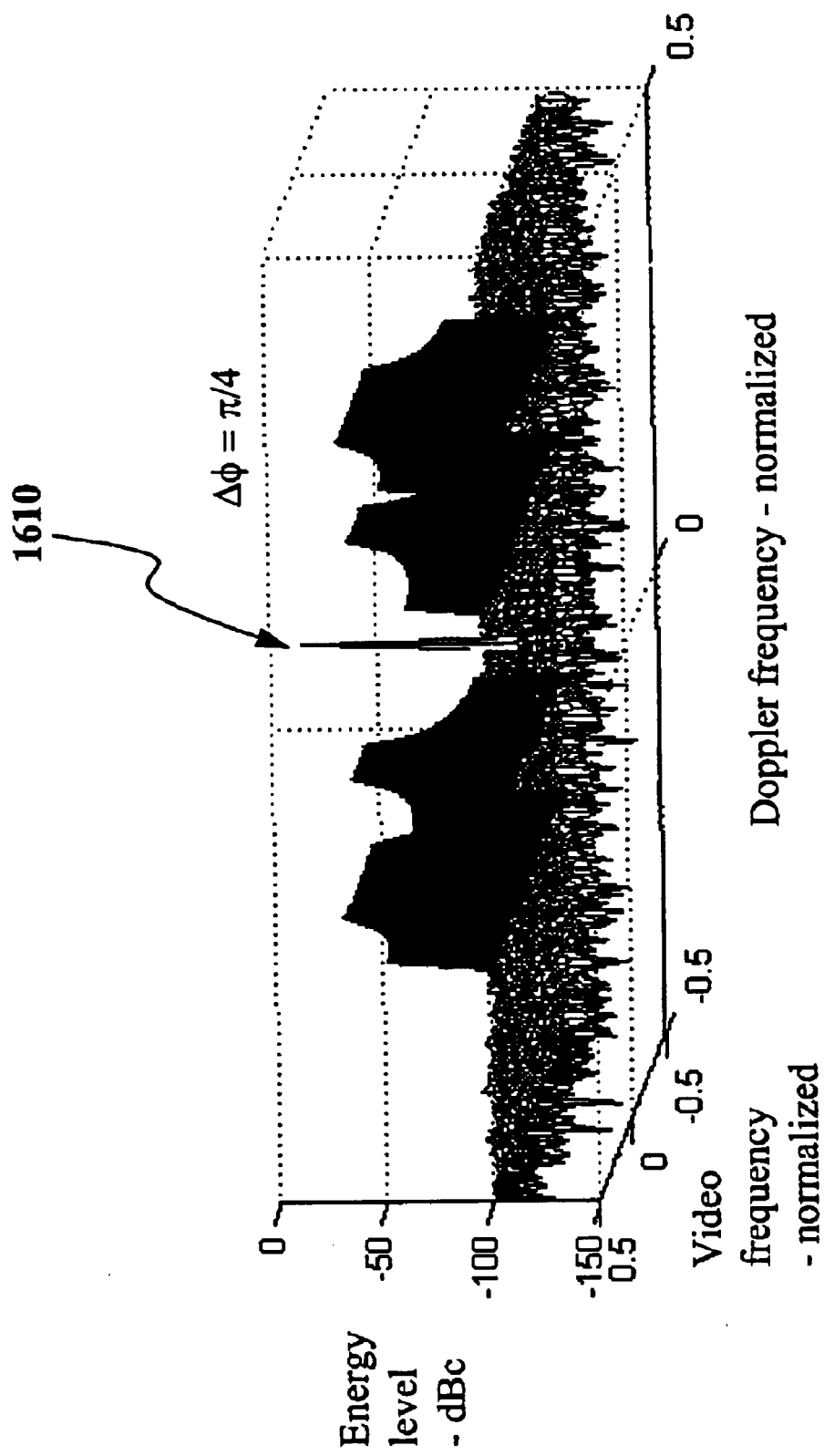
FIG. 16 illustrates an example energy map (image) or point scatterer in radar with LO feed-through and I/Q imbalance.

A single point scatterer would form a range-Doppler energy distribution (i.e. SAR image) as illustrated in FIG. 16. Note how the LO feed-through energy and I/Q imbalance energy in a focussed SAR image manifest themselves as a chirp spectrum appropriately offset in Doppler from the desired impulse 1610 at the image center. While the present inventors propose that this separation can be exploited as is, they also have noted that this separation can assist in making independent measurements of the various undesired signal components to facilitate compensation as described earlier. Nevertheless, if the desired signal is really a set of signals that span a Doppler bandwidth of $B_{Doppler}$, then the LO feed-through and I/Q imbalance signals will each also contain Doppler bandwidths of $B_{Doppler}$, but centered at their respective Doppler offsets. If no contamination of the entire Doppler bandwidth associated with the desired signal is insisted on, then a minimum imposed value on the pulse-to-pulse phase shift will be:

$$\Delta\phi \geq 2\pi\left(\frac{B_{Doppler}}{f_p}\right).$$

Furthermore, to keep the Doppler bandwidths of aliased undesired signals from contaminating any part of the desired signal's Doppler spectrum, require:

$$\Delta\phi \leq \pi\left(1 - \frac{B_{Doppler}}{f_p}\right).$$

These combine to form the restriction $f_p \geq 3B_{Doppler}$.

If, however, one is ultimately interested in merely a lesser portion of the desired signal's available Doppler spectrum, then some encroachment can be tolerated, and the restriction $f_p > 3B_{Doppler}$, can be relaxed.

Figure 17:
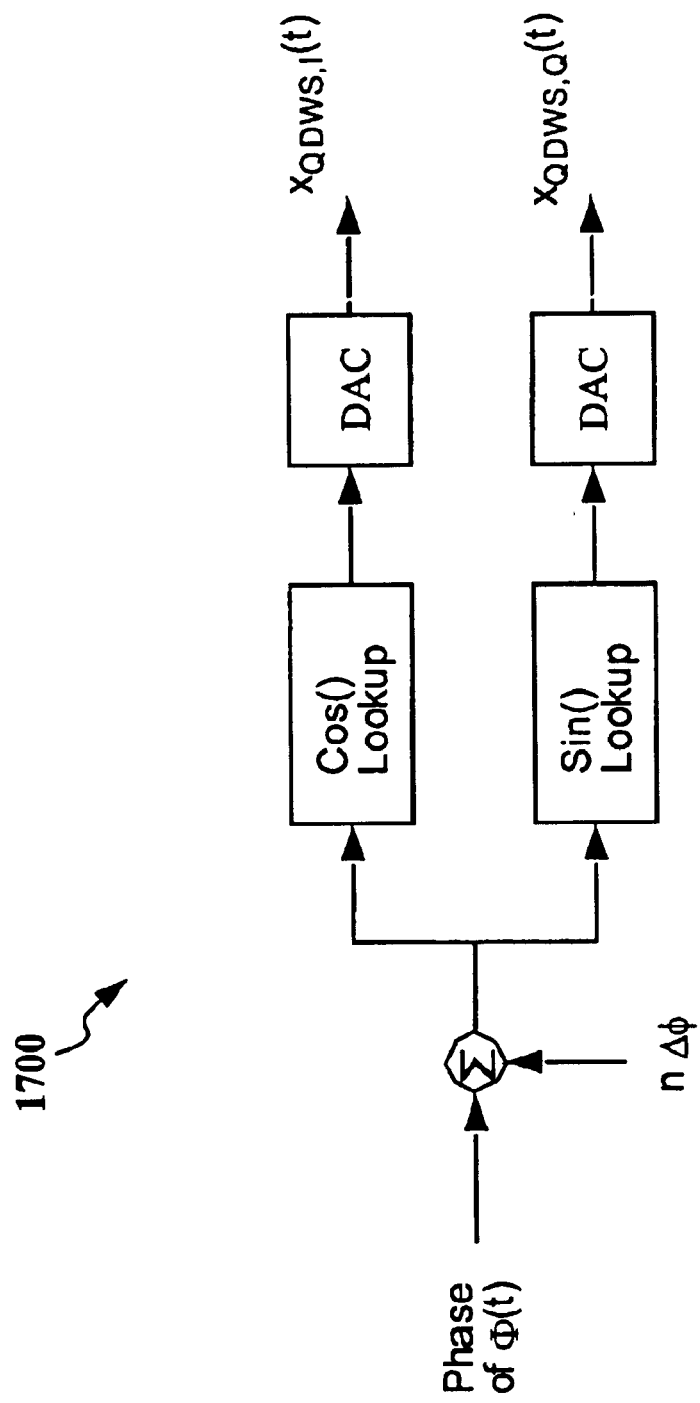
FIG. 17 illustrates insertion of a rolling phase shift into the QDWS output.

FIG. 17 illustrates a system 1700 wherein Doppler modulation can be implemented within a QDWS (ignoring any amplitude corrections). A particularly interesting configuration is for $\Delta\phi=\pi/2$, which requires $f_p \geq 4B_{Doppler}$. The following table describes the QDWS outputs for this case (neglecting amplitude modulations).

QDWS outputs for $\Delta\phi=\pi/2$:

| $(n\Delta\phi)$ | $x_{QDWS,I}(t)$ | $x_{QDWS,Q}(t)$ |
| --- | --- | --- |
| 0 | $\cos\Phi(t)$ | $\sin\Phi(t)$ |
| $\pi/2$ | $-\sin\Phi(t)$ | $\cos\Phi(t)$ |
| $\pi$ | $-\cos\Phi(t)$ | $-\sin\Phi(t)$ |
| $3\pi/2$ | $\sin\Phi(t)$ | $-\cos\Phi(t)$ |

Figure 18:
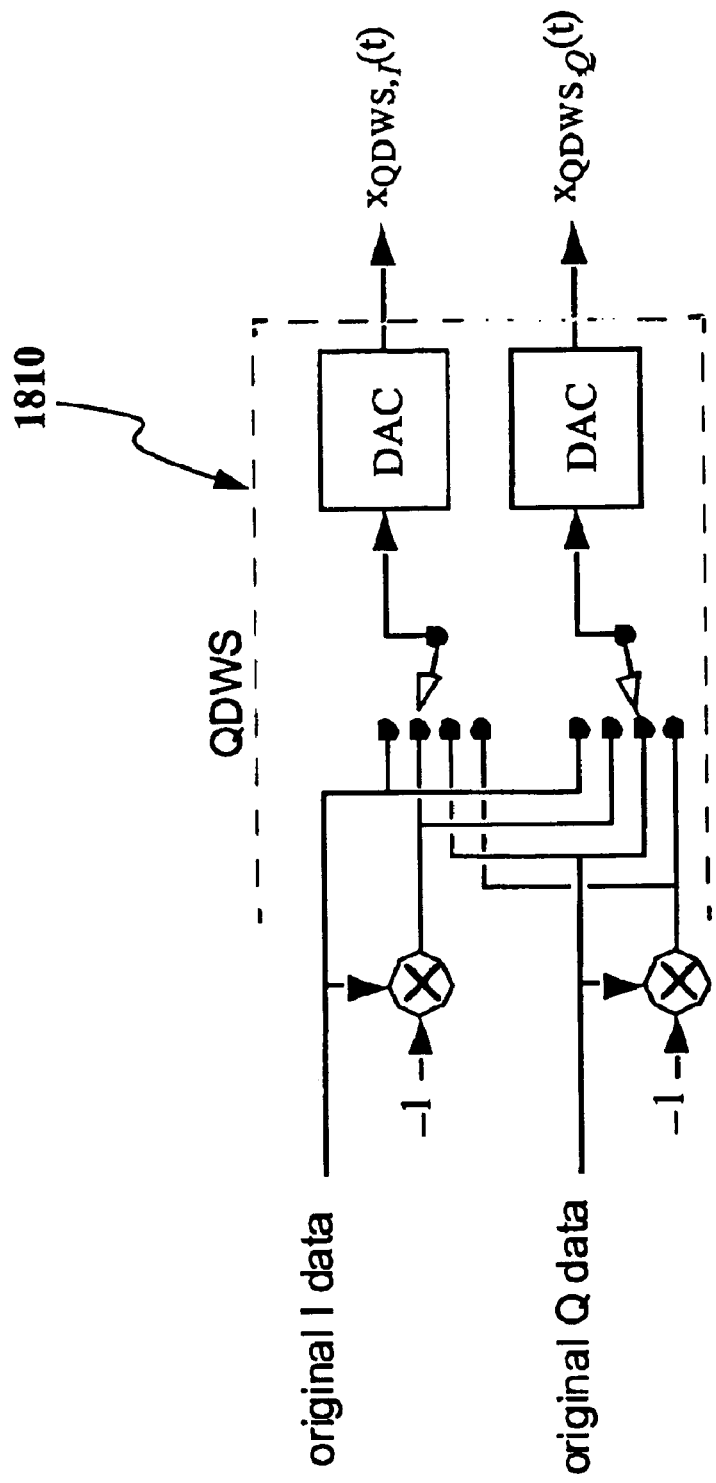
FIG. 18 illustrates a method for generating $\pi/2$ rad./pulse modulation of the QDWS phase.

As indicated, the phase shifts can be implemented as merely transpositions and negations of the I and Q channel outputs. This might be accomplished with suitable switch combinations as illustrated for the QDWS 1810 illustrated in FIG. 18.

In any case, employing rolling phase shifts on a pulse-to-pulse basis allows Doppler separation in the receiver of the desired signal from those undesired and due to LO feed-through and quadrature imbalance. Doppler filtering can then mitigate the effects of LO feed-through and quadrature imbalance, without the need for any calibration in the transmitter.

Parameter Estimation for Equalization

Some occasions might nevertheless exist where Doppler filtering is not an available option, perhaps because an adequate radar PRF cannot be employed. In this situation, balancing and equalization as previously described are still available to facilitate clean signals. No calibration scheme, however, has yet been identified to accomplish balance and equalization.

The present inventors provide estimation, with some precision, of the parametric values, of LO feed-through and I/Q imbalance (or their equivalent) using measurements of the video signal. Values so derived could then be used to compensate the LO feed-through and equalize the I/Q imbalance in a manner previously discussed. A system can be placed in a calibration or test mode to facilitate these measurements and techniques, and that many pulses can be integrated to achieve good Signal to Noise ratios. A test signal can also be employed with a delay-line to avoid any Doppler spreading of the echo signal.

To unambiguously measure a parameter, it must first be isolated from other obscuring or otherwise confusing factors. To separate the desired signal from the LO feed-through, and these from the I/Q imbalance energy, Doppler separation can be employed as previously discussed. That is, QDWS outputs employing a rolling pulse-to-pulse phase shift can be used. The video signal model then becomes:

$$x_V(t) = \begin{bmatrix} \exp j(M\omega_0(t_m - t_s) + M(\Phi(t - t_s) - \Phi(t - t_m)) + M(\varphi_{0,s} - \varphi_{0,m})) \\ \left( \begin{array}{l} 1 + \\ \exp j(2n\Delta\phi)[MA_{I,m}\exp j(2\Phi(t - t_m) + 2\theta_{i1,m} + \varphi_{I,m})] + \\ \exp - j(2n\Delta\phi)[MA_{I,s}\exp - j(2\Phi(t - t_s) + 2\theta_{i1,s} + \varphi_{I,s})] + \\ \exp j(n\Delta\phi)[MA_{L,m}\exp j(\Phi(t - t_m) + \theta_{i1,m} - \theta_{g0,m} - \varphi_{L,m})] + \\ \exp - j(n\Delta\phi)[MA_{L,s}\exp - j(\Phi(t - t_s) + \theta_{i1,s} - \theta_{g0,s} - \varphi_{L,s})] \end{array} \right) \end{bmatrix}$$

A pulse-to-pulse phase shift can be chosen to allow clear separation and identification of the LO feed-through from the I/Q imbalance energy. A reasonable value might be $\Delta\phi = \pi/4$. This can cause LO feed-through energy to be centered at Doppler frequencies $\pm f_p/8$, and I/Q imbalance energy to be centered at Doppler frequencies $\pm f_p/4$, thereby separating them from the desired signal as well as any aliased energy.

Recall that the following was earlier defined:

$$A_I \exp - j\varphi_I = -\frac{1}{2}\left(\frac{\Delta k - j\Delta\theta}{1 + k_{i1} + j\theta_{q0}}\right), \text{ and}$$

$$A_L \exp j\varphi_L = \left(\frac{k_{g0}}{1 + k_{i1} + j\theta_{q0}}\right).$$

where $\Delta k$, $\Delta \theta$, and $k_{i1}$ are frequency dependent. That is, if $\Phi(t) = \omega_T t$, then these depend on $\omega_T$. Note that $\theta_{q0}$ in the present model is a phase shift of a constant LO frequency signal, and consequently is not normally expected to depend on $\omega_T$, but yet might.

LO Feed-Through Parameter Estimation

With appropriate Doppler processing, a Doppler component $\exp j(n\Delta\phi)$ can be extracted uniquely due to the LO feed-through signal, and can be identified as:

$$x_V(t)|_{\Delta\phi} = \begin{bmatrix} \exp j(M\omega_0(t_m - t_s) + M(\Phi(t - t_s) - \Phi(t - t_m)) + \\ M(\varphi_{0,s} - \varphi_{0,m})) \times MA_{L,m}\exp j(\Phi(t - t_m) + \theta_{i1,m} - \theta_{g0,m} - \varphi_{L,m}) \end{bmatrix}.$$

A convenient QDWS modulation signal can be chosen (e.g., a sinusoid) where:

$$\Phi(t) = \omega_T t = 2\pi f_T t,$$

where $f_T$ is less than the video cutoff frequency, that is $|f_T| < B_V$.

Then a video signal can be expanded and modeled by:

$$x_V(t)|_{\Delta\phi} = MA_{L,m}\exp j\left(\begin{array}{l} 2\pi f_T(t - t_m) + M(\omega_0 + 2\pi f_T)(t_m - t_s) + \\ M(\varphi_{0,s} - \varphi_{0,m}) + \theta_{i1,m} - \theta_{g0,m} - \varphi_{L,m} \end{array}\right)$$

Performing a Fourier Transform over the envelope finite interval $-T/2 \leq (t - t_m) \leq T/2$ yields:

$$X_V(f)|_{\Delta\phi} =$$

$$TMA_{L,m}\exp j\left(\begin{array}{l} M(\omega_0 + 2\pi f_T)(t_m - t_s) + \\ M(\varphi_{0,s} - \varphi_{0,m}) + \theta_{i1,m} - \theta_{g0,m} - \varphi_{L,m} \end{array}\right)\text{sinc}\left(\frac{f - f_T}{T}\right).$$

In particular, at the spectral peak, we identify:

$$X_V(f_T)|_{\Delta\phi} = TMA_{L,m}\exp j\left(\begin{array}{l} M(\omega_0 + 2\pi f_T)(t_m - t_s) + \\ M(\varphi_{0,s} - \varphi_{0,m}) + \theta_{i1,m} - \theta_{g0,m} - \varphi_{L,m} \end{array}\right)$$

which has magnitude:

$$|X_V(f_T)|_{\Delta\phi}| = TMA_{L,m} = \frac{TMk_{g0}}{\sqrt{(1 + k_{i1})^2 + (\theta_{q0})^2}}.$$

The known parameters are T, M, $\omega_0$, $f_T$, $t_m$, $t_s$, and of course $X_V(f_T)$. The unknown parameters are $k_{g0}$, $k_{i1}$, $\theta_{i1}$, $\theta_{q0}$, and $\theta_{g0}$. The best we can do here is ascertain the quantities $k_{g0}/\sqrt{(1+k_{i1})^2 + (\theta_{q0})^2}$ and $\lfloor M(\phi_{0,s} - \phi_{0,m}) + \theta_{i1m} - \theta_{g0,m} - \phi_{L,m} \rfloor$ which still leaves some ambiguity in the specific parameters whose value is desired to be known. Identifying precisely $k_{g0}$, and $\theta_{g0}$ is problematic given that they are perturbed by unknown values of $k_{i1}$ and $\theta_{i1}$, among others.

Rather than identify these parameters specifically, it should be recognized given the frequency that the aim of calibration is to ascertain the DC offsets to minimize the offending components in the received signal.

Equivalent SSB Mixer DC Offset Estimation

Reexamining the earlier discussion about compensating LO feed-through with a DC offset into the SSB mixer, it should be recognized that the mixer output with no QDWS input signal is given by (ignoring I/Q imbalance and LO phase shift term $\theta_{q0}$ for the moment):

$$x_{Mixer}(t) = \frac{1}{2}(k_{g0}\cos(\theta_{g0}) + jk_{g0}\sin(\theta_{g0}))\exp j(\omega_0 t)$$

with magnitude $k_{g0}/2$. Even small values for $\theta_{q0}$ won't change this much.

On the other hand, with DC offsets applied to the SSB mixer input, as previously discussed, the output is described by:

$$x_{Mixer}(t) = \frac{1}{2}\left(\begin{array}{l} \lfloor V_{L,I}H_I(0) + k_{g0}\cos(\theta_{g0}) - V_{L,Q}H_Q(0)\sin(\theta_{q0}) \rfloor + \\ j[V_{L,Q}H_Q(0)\cos(\theta_{q0}) + k_{g0}\sin(\theta_{g0})] \end{array}\right)\exp j(\omega_0 t).$$

By now defining:

$$k_{g0,eq} = \sqrt{\begin{array}{l} (V_{L,I}H_I(0) + k_{g0}\cos(\theta_{g0}) - V_{L,Q}H_Q(0)\sin(\theta_{q0}))^2 + \\ (V_{L,Q}H_Q(0)\cos(\theta_{q0}) + k_{g0}\sin(\theta_{g0}))^2 \end{array}}, \text{ and}$$

-continued $$A_{L,m,eq} = \frac{k_{g0,eq}}{\sqrt{(1+k_{iI})^2 + (\theta_{q0})^2}}$$

the measured video signal spectral peak, when a DC offset is applied to the SSB mixer input, becomes:

$$|X_V(f_T)|_{\Delta\phi} = TMA_{L,m,eq} = \frac{TMk_{g0,eq}}{\sqrt{(1+k_{iI})^2 + (\theta_{q0})^2}}.$$

The task at hand is now to find $V_{L,I}$ and $V_{L,Q}$ to force as nearly as possible $k_{g0,eq}=0$, and thereby $X_V(f_T)|_{\Delta\phi}=0$. Clearly, these DC offsets also encompass the effects of other relevant factors influencing LO feed-through, such as $H_I(0)$ and $H_Q(0)$. In any case, the essential task is to find appropriate parameters $V_{L,I}$ and $V_{L,Q}$ to nullify LO feed-through.

Of interest should be the fact that if $\theta_{q0}=0$, then $V_{L,I}$ and $V_{L,Q}$ can be independently minimized to achieve an overall solution. That is, the value for $V_{L,I}$ that minimizes $k_{g0,eq}$ does so regardless of $V_{L,Q}$, and likewise the value for $V_{L,Q}$ that minimizes $k_{g0,eq}$ does so regardless of $V_{L,I}$. However, generally $\theta_{g0}\neq 0$, so their values do influence each other somewhat, although probably not very much since $\theta_{q0}$ is typically expected to be small.

Several possible techniques to find optimal $V_{L,I}$ and $V_{L,Q}$ are presented herein.

Technique 1

The first procedure amounts to guessing about new solutions and keeping the better solution between the new and the old.

1) Guess an initial value for $V_{L,I}$ and $V_{L,Q}$, and calculate $|X_V(f_T)|_{\Delta\phi}|$.
2) Guess another value for $V_{L,I}$ and recalculate $|X_V(f_T)|_{\Delta\phi}|$.
3) Remember the value for $V_{L,I}$ that gave the minimum $|X^V(f_T)|_{\Delta\phi}|$.
4) Guess another value for $V_{L,Q}$ and recalculate $|X_V(f_T)|_{\Delta\phi}|$.
5) Remember the value for $V_{L,Q}$ that gave the minimum $|X_V(f_T)|_{\Delta\phi}|$.
6) Return to step 2 and repeat until performance requirements are met.

Technique 2—Systematic Search

The procedure becomes to alternately 'tune' each of $V_{L,I}$ and $V_{L,Q}$ to a minimum $|X_V(f_T)|_{\Delta\phi}|$.

1) Set initial values for $V_{L,I}$ and $V_{L,Q}$.
2) Begin with $V_{L,I}$ at its absolute minimum value and calculate $|X_V(f_T)|_{\Delta\phi}|$.
3) Set an initial step size for $V_{L,I}$ at some positive $\Delta V$.
4) Increment $V_{L,I}$ by $\Delta V$ and recalculate $|X_V(f_T)|_{\Delta\phi}|$.
5) Repeat step 4 until the new $|X_V(f_T)|_{\Delta\phi}|$ is greater than the old.
6) Adjust the step size and direction such that $\Delta V_{new}=-\Delta V_{old}/2$.
7) Go back to step 4 and repeat until no discernable improvement is observed.
8) Repeat steps 2 through 7 for $V_{L,Q}$.
9) Repeat steps 2 through 7 again for $V_{L,I}$.
10) Repeat steps 8 and 9 until performance criteria are met.

Technique 3—Gradient Search

The equation of the energy at $f_T$ is:

$$|X_V(f_T)|_{\Delta\phi}|^2 = \left[\frac{(TM)^2}{(1+k_{iI})^2+(\theta_{q0})^2}\right](k_{g0,eq})^2$$

where $k_{g0,eq}$ depends on both $V_{L,I}$ and $V_{L,Q}$. Plotting energy as a function $V_{L,I}$ and $V_{L,Q}$ shows an error surface or bowl over the $V_{L,I}$, $V_{L,Q}$ plane. This error surface has both its local and its global minimum at the previously stated values:

$$V_{L,Q} = -\left(\frac{k_{g0}\sin(\theta_{g0})}{H_Q(0)\cos(\theta_{q0})}\right), \text{ and}$$

$$V_{L,I} = -\left(\frac{k_{g0}\cos(\theta_{g0}) - V_{L,Q}H_Q(0)\sin(\theta_{q0})}{H_I(0)}\right).$$

Note also that the minimum value for $V_{L,I}$ depends on the current value for $V_{L,Q}$ if $\theta_{q0}\neq 0$. Additionally, the greater the errors in $V_{L,I}$ and $V_{L,Q}$, the steeper is the gradient of the error surface. This leads to the techniques of gradient searches to find optimal $V_{L,I}$ and $V_{L,Q}$. Specifically, we implement:

$$V_{L,Q,new} = V_{L,Q,old} - \mu\frac{d}{dV_{L,Q}}|X_V(f_T)|_{\Delta\phi}|^2, \text{ and}$$

$$V_{L,I,new} = V_{L,I,old} - \mu\frac{d}{dV_{L,I}}|X_V(f_T)|_{\Delta\phi}|^2,$$

where $\mu$ is a convergence constant, usually chosen to be small enough to allow gradual convergence.

Derivatives can be estimated by making measurements of the energy at $f_T$ for slightly different values of offset voltage, that is:

$$\frac{d}{dV_{L,Q}}|X_V(f_T)|_{\Delta\phi}|^2 \approx \frac{\Delta|X_V(f_T)|_{\Delta\phi}|^2}{\Delta V_{L,Q}}, \text{ and}$$

$$\frac{d}{dV_{L,I}}|X_V(f_T)|_{\Delta\phi}|^2 \approx \frac{\Delta|X_V(f_T)|_{\Delta\phi}|^2}{\Delta V_{L,I}}.$$

A suitable algorithm can then be:

1) Select initial $V_{L,I}$ and $V_{L,Q}$.
2) Measure the energy at $f_T$ for $V_{L,Q}-(\Delta V_{L,Q}/2)$ and $V_{L,Q}+(\Delta V_{L,Q}/2)$, and estimate error gradient.
3) Update estimate for $V_{L,Q}$.
4) Measure the energy at $f_T$ for $V_{L,I}-(\Delta V_{L,I}/2)$ and $V_{L,I}+(\Delta V_{L,I}/2)$, and estimate error gradient.
5) Update estimates for $V_{L,I}$.
6) Go back to step 2 and repeat until derivative estimates are zero (or suitably small), or some other exit criteria is met.

Figure 19:
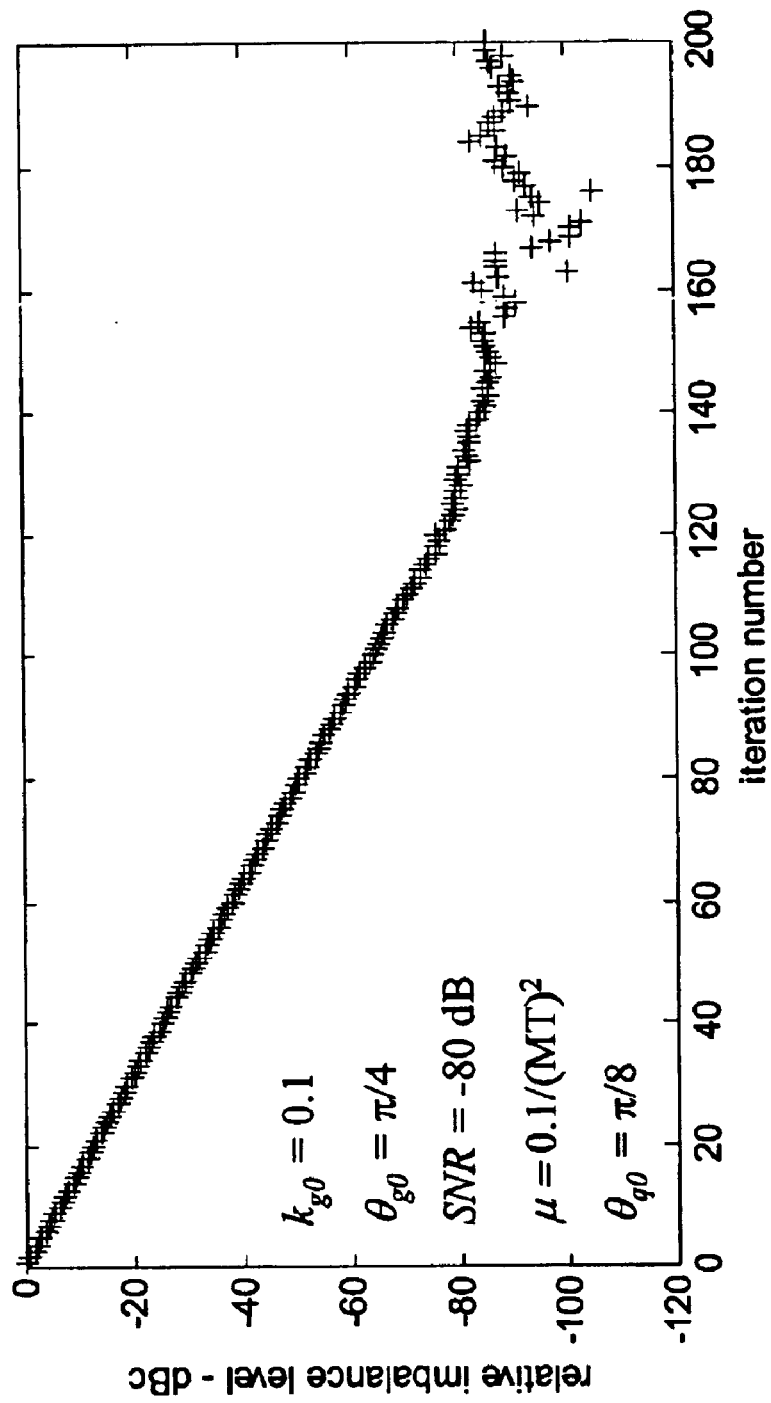
FIG. 19 illustrates a simulation of gradient search method for nulling LO feed-through signal, SNR is for desired signal after compression.

The inventors in a simulation implemented the procedure with results displayed in the graph illustrated in FIG. 19.

The nature of this gradient search technique is that the final imbalance level will be limited to somewhat below the noise floor of the desired signal, depending on convergence parameter $\mu$. In general, smaller values for $\mu$ would allow convergence to a lower noise floor, but cause slower convergence. Schemes might be employed whereby $\mu$ adapts from larger values to smaller values either with time, or as residual imbalance energy diminishes. This kind of adaptive algorithm sometimes goes by the name "simulated annealing."

Furthermore, the Fourier Transform, while useful in enhancing SNR, isn't completely necessary for determining the presence of LO feed-through energy for a frequency independent leakage. The leakage (subject to noise) is generally time independent as well, and exists for each time sample. That is:

$$|x_V(t)|_{\Delta\phi} = |x_V(t_m)|_{\Delta\phi} = \left(\frac{Mk_{g0,eq}}{1+k_{iI}}\right),$$

which implies that any one sample of time domain video signal is adequate to indicate relative magnitudes for $k_{g0,eq}$. Consequently, one could generally avoid the Fourier Transform and substitute into the algorithms a scaled time sample of the video signal:

$$|X_V(f_T)|_{\Delta\phi} \to T|x_V(t_m)|_{\Delta\phi}.$$

A somewhat in-between substitution that works for reasonably good video signal SNR, that still doesn't involve a Fourier Transform, is the substitution of a non-coherent magnitude integration over time, namely:

$$|X_V(f_T)|_{\Delta\phi} \to \int |x_V(t)|_{\Delta\phi} dt.$$

If SNR is still problematic, more pulses might be coherently combined in Doppler processing, prior to any video signal component analysis.

Frequency-Dependent LO Feed-Through Parameter Estimation

The previous model presumes that $V_{L,I}$ and $V_{L,Q}$ are true constants, independent of frequency $f_T$. In the event that some dependence on $f_T$ does in fact exist, then the aforementioned procedures would need to be repeated for other sample modulation frequencies $f_T$. $V_{L,I}$ and $V_{L,Q}$ values would be determined that depend on an instantaneous frequency indication from the QDWS, and then could be interpolated for frequencies in-between those in our calibration sample set.

With the QDWS offering only sinusoidal signals at constant frequency $f_T$, the video signal component of interest contains spectral energy at $f_T$. If $f_T$ is outside of the video passband, then it can be severely attenuated by the video filter, which is of course precisely what a video filter is suppose to do. Whatever attenuated energy does pass through the video filter, if beyond the Nyquist frequency in a sampled signal, can be aliased to an equivalent in-band frequency. As long as the offending energy is adequately attenuated for QDWS constant frequency modulation, balancing the QDWS at frequencies $|f_T|>B_V$ is generally of little concern.

For LFM chirp signals, however, where bandwidth substantially greater than the video bandwidth is experienced, balancing the QDWS frequencies $|f_T|>B_V$ becomes important.

Effects of LFM Chirps on LO Feed-through Compensation

To properly understand this topic, the generic video signal component can be returned to and with it a LFM chirp can be incorporated by substituting $\Phi(t)=\omega_T t+(\gamma_T/2)t^2$ where $\gamma_t$ is the chirp rate. This yields a Doppler spectral component:

$$x_V(t)|_{\Delta\phi} = MA_{L,m}\begin{bmatrix}\exp j\begin{pmatrix}M(\omega_0+\omega_T)(t_m-t_s)+M\frac{\gamma_T}{2}(t_m-t_s)^2+\\M(\varphi_{0,s}-\varphi_{0,m})+\theta_{iI,m}-\theta_{g0,m}-\varphi_{L,m}\end{pmatrix}\times\\\exp j\left((\omega_T+M\gamma_T(t_m-t_s))(t-t_m)+\frac{\gamma_T}{2}(t-t_m)^2\right)\end{bmatrix}.$$

The QDWS output, appropriately delayed, has instantaneous frequency:

$$\omega_{\Phi,inst}=\frac{d}{dt}\Phi(t-t_m)=\omega_T+\gamma_T(t-t_m)$$

whereas the video signal has instantaneous frequency:

$$\omega_{V,inst}=\omega_T+M\gamma_T(t_m-t_s)+\gamma_T(t-t_m)=\omega_{\Phi,inst}+M\gamma_T(t_m-t_s)$$

In units of Hz, this would be:

$$f_{V,inst}=f_{\Phi,inst}+M\frac{\gamma_T}{2\pi}(t_m-t_s).$$

This also states that any portion of the QDWS chirp can be translated to any other video frequency range by adjusting the relative delay ($t_m-t_s$).

The video filter limits $|f_{V,inst}|\leq B_V$, so that the QDWS frequencies observable in the video are:

$$\left[-B_V-M\frac{\gamma_T}{2\pi}(t_m-t_s)\right]\leq f_{\Phi,inst}\leq\left[B_V-M\frac{\gamma_T}{2\pi}(t_m-t_s)\right].$$

Clearly, when employing a LFM chirp, one can observe any QDWS instantaneous frequency that is chosen, using any video filter bandwidth available, by simply adjusting the relative delay ($t_m-t_s$). There are, however, important side effects to bear in mind. Specifically, the time interval over which can be observed where the problem energy is somewhat less than the entire pulse, which also impacts the total energy that is observable in this component of the video signal. This is illustrated in the time-frequency diagram in FIG. 20.

The total time interval over which the LO feed-through generated chirp is observable (within the video filter passband) is:

$$T_{obs}=T\left(\frac{2B_V}{B_\Phi}\right)$$

where, $$B_\Phi=\frac{\gamma_T}{2\pi}T=\text{the total chirp bandwidth at the QDWS output.}$$

The observation interval is centered at $t-t_m=-(\omega_t/\gamma_T+M(t_m-t_s))$. One can presume that this dominates all the other implied envelopes, such that the actual envelope for the problem chirp can be approximated by this observation interval, that is, the observation envelope is given by:

$$rect\left(\frac{t-t_m+(\omega_T/\gamma_T+M(t_m-t_s))}{T_{obs}}\right),$$

which can now overtly be included in the video signal, describing it as:

$$x_V(t)|_{\Delta\phi}=MA_{L,m}\begin{bmatrix}\exp j\begin{pmatrix}M(\omega_0+\omega_T)(t_m-t_s)+M\frac{\gamma_T}{2}(t_m-t_s)^2+\\M(\varphi_{0,s}-\varphi_{0,m})+\theta_{iI,m}-\theta_{g0,m}-\varphi_{L,m}\end{pmatrix}\times\\\exp j\left((\omega_T+M\gamma_T(t_m-t_s))(t-t_m)+\frac{\gamma_T}{2}(t-t_m)^2\right)\times\\rect\left(\frac{t-t_m+(\omega_T/\gamma_T+M(t_m-t_s))}{T_{obs}}\right)\end{bmatrix}.$$

Nevertheless, within the observation window, a particular observation time corresponds directly to a QDWS instantaneous frequency by:

$$f_{\Phi,inst} = \frac{\omega_T}{2\pi} + \frac{\gamma_T}{2\pi}(t - t_m).$$

Consequently, mitigating LO feed-through at a particular QDWS instantaneous output frequency $f_{\Phi,inst}$ can be observed by nulling any energy at a particular observation time $(t-t_m)$, given that the observation time is in fact observable—that is, within the envelope $rect((t-t_m+(\omega_T/\gamma_T+M(t_m-t_s)))/T_{obs})$. All of this can lead to employment of generic procedures for identifying optimal $V_{L,I}$ and $V_{L,Q}$ as functions of instantaneous QDWS output frequency $f_{\Phi,inst}$.

Procedure for Frequency-dependent LO Feed-through Equalization

An overall algorithm for identifying frequency dependent values for $V_{L,I}$ and $V_{L,Q}$ can be adopted as follows.

1) Divide the QDWS output frequency range into segments no wider than $2B_V$.
2) For each frequency segment, center it in the video passband with appropriate selection of $(t_m-t_s)$.
3) Generate data for new $V_{L,I}$ and $V_{L,Q}$ functions, and extract the appropriate video component $x_V(t)|_{\Delta\Phi}$.
4) Update estimates of more optimal $V_{L,I}$ and $V_{L,Q}$ as a function of appropriate $f_{\Phi,inst}$ based on measurements of energy at corresponding times $(t-t_m)$.
5) Go back to step 3 and repeat until satisfied with the results in this frequency range.
6) Go back to step 2 and repeat for the next frequency range until done.

With this procedure, no Fourier Transform is required. This also means that no corresponding benefit in noise reduction is available that the Fourier Transform brought. Consequently, adequate noise reduction might require enhanced coherent processing gain from Doppler processing, which is, collecting more pulses. For example, if −60 dB LO feed-through suppression is desired, then enough pulses need to be collected to achieve in the neighborhood of 60 dB SNR in the primary signal's Doppler cell.

Any of the techniques previously discussed for updating $V_{L,I}$ and $V_{L,Q}$ (genetic search, systematic searching, or gradient searching) can be used, but with the substitute:

$$|X_V(f_T)|_{\Delta\phi} \rightarrow \left| x_v\left(t_m + \frac{2\pi f_{\Phi,inst} - \omega_T}{\gamma_T}\right)\right|_{\Delta\phi}.$$

This is the result of employing a LFM chirp instead of a constant frequency.

Frequency dependent I/Q Imbalance Parameter Estimation

With appropriate Doppler processing a Doppler component $\exp j(2n\Delta\phi)$ can be extracted uniquely due to the I/Q imbalance signal in a manner similar to identifying the LO feed-through signal, and identified as:

$$x_V(t)|_{2\Delta\phi} = MA_{l,m}\begin{bmatrix} \exp j(M\omega_0(t_m-t_s) + M(\varphi_{0,s}-\varphi_{0,m}) + 2\theta_{i1,m} + \varphi_{l,m}) \times \\ \exp j(M(\Phi(t-t_s)-\Phi(t-t_m))) \times \\ \exp j(2\Phi(t-t_m)) \end{bmatrix}.$$

The phase function $\Phi(t)$ will contain time-varying frequencies by design, which with this feature of the invention can be a LFM chirp. Consequently, the entities $A_{I,m}$, $\theta_{i1,m}$, and $\phi_{I,m}$ can also display their frequency dependencies in the video signal. Furthermore, as with the notion of a frequency-dependent LO feed-through parameter, quadrature balance can be achieved when we force $A_{I,m}=0$ over the entire range of QDWS frequencies. This implies, as described in the previous section, that measurements made with a single frequency will be inadequate to the task. That is, measurements need to be made with:

$$\Phi(t)=\omega_T t+(\gamma_T/2)t^2.$$

With the LFM chirp, the video signal component of interest becomes:

$$x_V(t)|_{2\Delta\phi} = \\ MA_{l,m}\begin{bmatrix} \exp j\begin{pmatrix} M(\omega_0 + \omega_T)(t_m-t_s) + M\frac{\gamma_T}{2}(t_m-t_s)^2 + \\ M(\varphi_{0,s}-\varphi_{0,m}) + 2\theta_{i1,m} + \varphi_{l,m} \end{pmatrix} \times \\ \exp j((2\omega_T + M\gamma_T(t_m-t_s))(t-t_m) + \gamma_T(t-t_m)^2) \end{bmatrix}.$$

The QDWS output, appropriately delayed, as before, has instantaneous frequency:

$$\omega_{\Phi,inst} = \frac{d}{dt}\Phi(t-t_m) = \omega_T + \gamma_T(t-t_m),$$

whereas the video signal has instantaneous frequency:

$$\omega_{V,inst}=\omega_T+M\gamma_T(t_m-t_s)+\gamma_T(t-t_m)=\omega_{\Phi,inst}+M\gamma_T(t_m-t_s)$$

In units of Hz, this would be:

$$f_{V,inst} = f_{\Phi,inst} + M\frac{\gamma_T}{2\pi}(t_m-t_s).$$

As with the LO feed-through, this process again states that any portion of the QDWS chirp can be translated to any other video frequency range by adjusting the relative delay $(t_m-T_s)$.

The video filter limits $|f_{V,inst}|\leq B_V$, so that the QDWS frequencies observable in the video due to I/Q imbalance become:

$$\left[\frac{-B_V - M\frac{\gamma_T}{2\pi}(t_m-t_s)}{2}\right] \leq f_{\Phi,inst} \leq \left[\frac{B_V - M\frac{\gamma_T}{2\pi}(t_m-t_s)}{2}\right].$$

Again, when employing a LFM chirp, one can observe any QDWS instantaneous frequency that is chosen, using any video filter bandwidth available, by simply adjusting the relative delay $(t_m-t_s)$.

Figure 20:
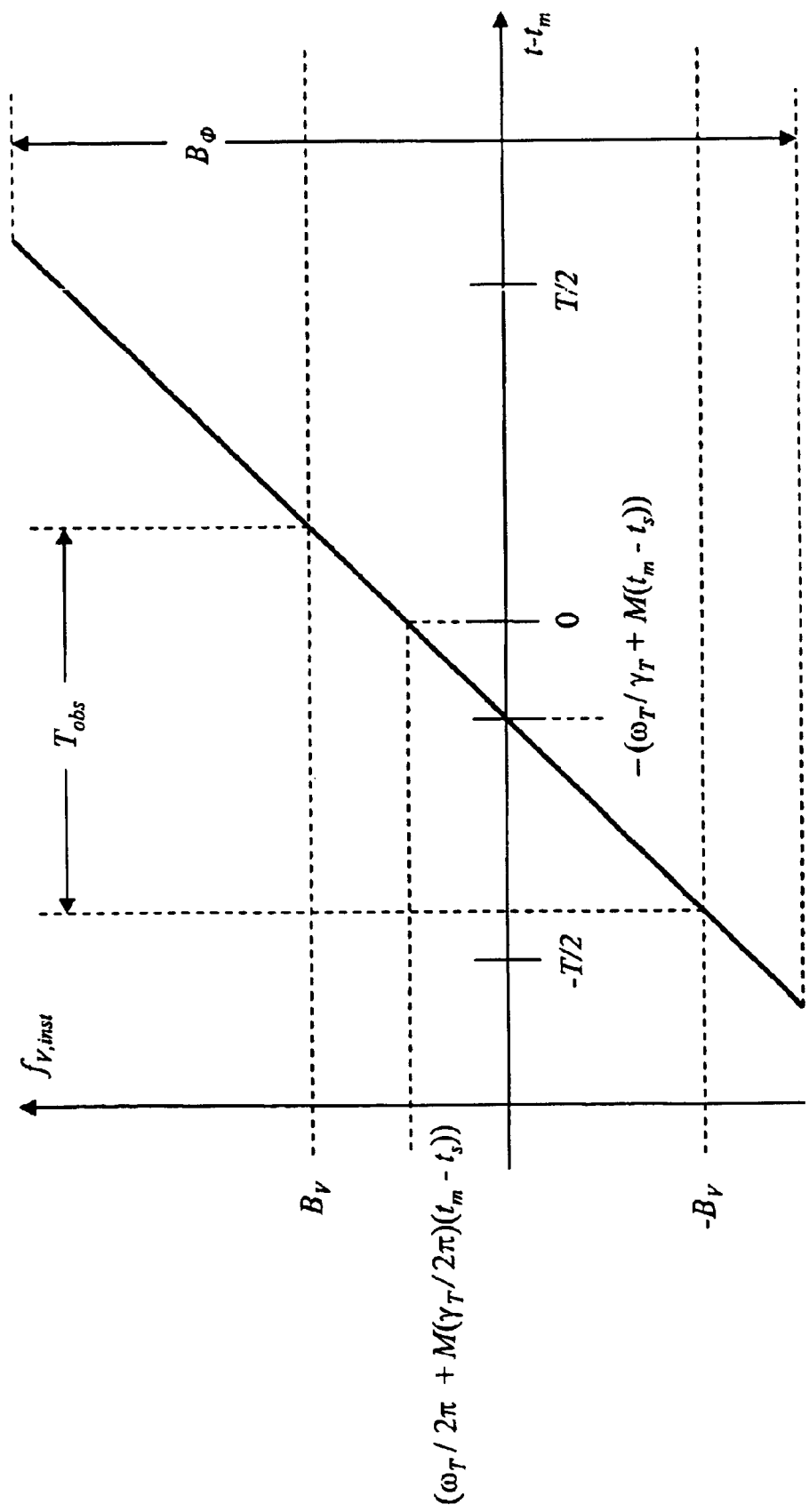
FIG. 20 illustrates the relationship of residual video LFM chirp due to LO feed-through to video bandwidth and relative echo delay time.
Figure 21:
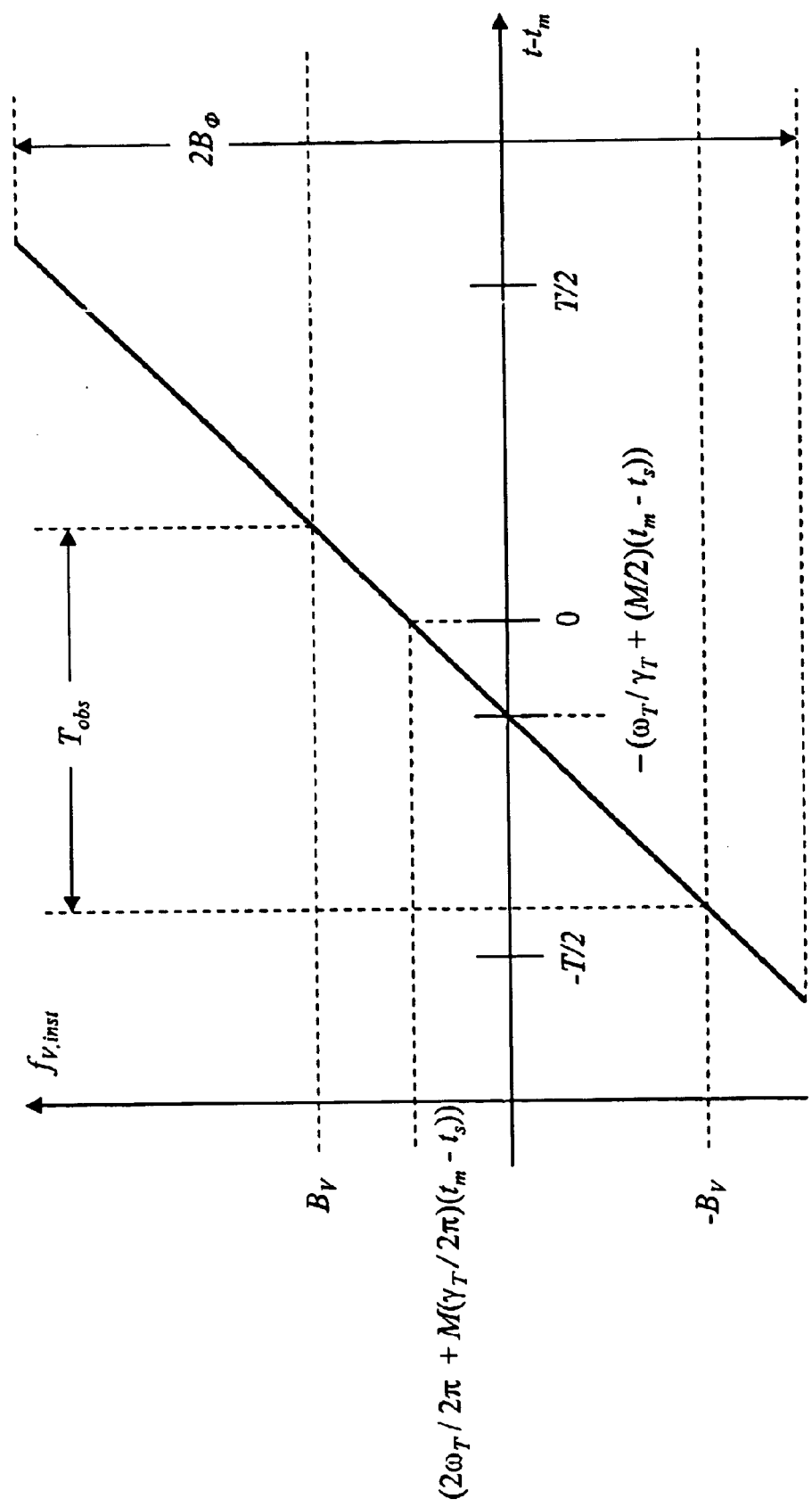
FIG. 21 illustrates the relationship of residual video LFM chirp due to quadrature channel imbalance to video bandwidth and relative echo delay time.
Figure 22A:
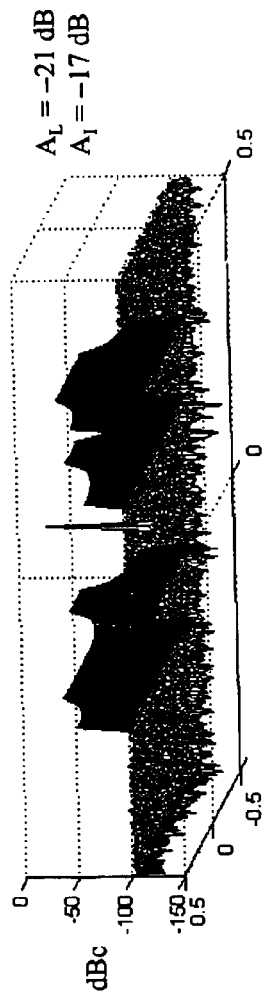
FIGS. 22A–22D illustrate simulations of LO feed-through migration and I/Q imbalance mitigation using gradient search parameter estimation. Images displayed are periodic snapshots of iterative cycles.
Figure 22B:
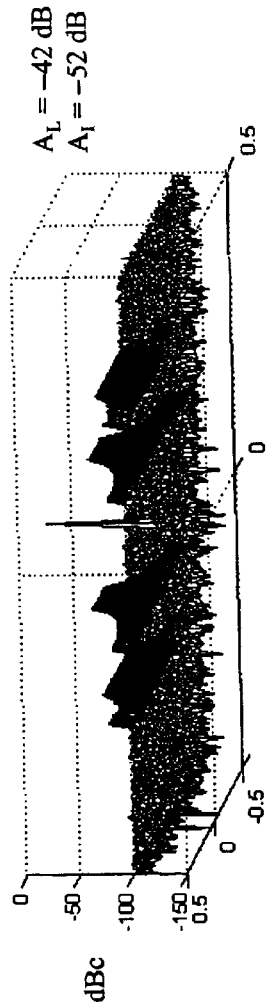
Figure 22C:
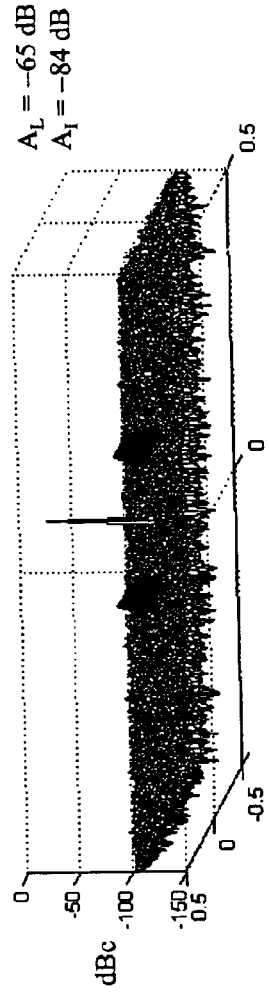
Figure 22D:
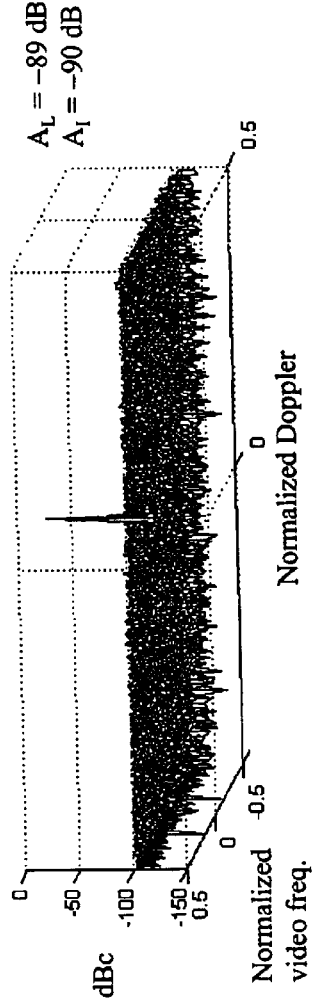

FIG. 20 is now shown slightly modified in the illustration of FIG. 21, so that the time interval over which one might observe the problem energy is still somewhat less than the entire pulse, which again also impacts the total energy that is observable in this component of the video signal.

The total time interval over which the LO feed-through generated chirp is observable (within the video filter passband) is now:

$$T_{obs} = T\left(\frac{B_V}{B_\Phi}\right)$$

which is reduced somewhat from the LO feed-through case.

The observation interval is now centered at $t-t_m=-(\omega_T/\gamma_T+M(t_m-t_s)/2)$. One can presume that this dominates all the other implied envelopes, such that the actual envelope for the problem chirp can be approximated by this observation interval—that is:

$$rect\left(\frac{t-t_m+(\omega_T/\gamma_T+M(t_m-t_s)/2)}{T_{obs}}\right).$$

which can now be overtly included in the video signal, describing it as:

$$x_V(t)|_{2\Delta\phi} = MA_{l,m} \begin{bmatrix} \exp j\left(\begin{array}{c} M(\omega_0+\omega_T)(t_m-t_s)+M\frac{\gamma_T}{2}(t_m-t_s)^2+ \\ M(\varphi_{0,s}-\varphi_{0,m})+2\theta_{i1,m}+\varphi_{l,m} \end{array}\right) \times \\ \exp j((2\omega_T+M\gamma_T(t_m-t_s))(t-t_m)+\gamma_T(t-t_m)^2) \times \\ rect\left(\frac{t-t_m+(\omega_T/\gamma_T+M(t_m-t_s)/2)}{T_{obs}}\right) \end{bmatrix}.$$

Nevertheless, within the observation window, a particular observation time still corresponds directly to a QDWS instantaneous frequency by:

$$f_{\Phi,inst} = \frac{\omega_T}{2\pi} + \frac{\gamma_T}{2\pi}(t-t_m).$$

Consequently, mitigating I/Q imbalance at a particular QDWS instantaneous output frequency $f_{\phi,inst}$ can be observed by nulling any energy at a particular observation time $(t-t_m)$, given that the observation time is in fact observable, that is, within the envelope: $rect((t-t_m+(\omega_T/\gamma_T+M(t_m-t_s)/2))/T_{obs})$.

The procedure calls for the initial selection of a particular value $(t_m-t_s)$ to thereby select an appropriate part of the QDWS output spectrum as observable within the video bandwidth. Then a particular QDWS output frequency $f_{\phi,inst}$ is identified as corresponding to the energy at time $(t-t_m)=(2\pi f_{\phi,inst}-\omega_T)/\gamma_T$.

At this particular time the following is identified:

$$|x_V(t)|_{2\Delta\phi}| = MA_{l,m} = \frac{M}{2}\left(\frac{\sqrt{\Delta k^2+\Delta\theta^2}}{\sqrt{(1+k_{i1})^2+\theta_{q0}^2}}\right)$$

where $\Delta k=(k_{q1,eq}-k_{i1,eq})$, and $\Delta\theta=(\theta_{q1,eq}-\theta_{i1,eq}-\theta_{q0})$, and furthermore:

$k_{i1,eq}=(1+k_{i1,Heq})(1+k_{i1})-1,$ $\theta_{i1,eq}=\theta_{i1}+\theta_{i1,Heq},$ $k_{q1,eq}(1+k_{q1,Heq})(1+k_{q1})-1,$ and $\theta_{q1,eq}=\theta_{q1}+\theta_{q1,Heq}.$ The adjustments available to the equalization process are $k_{i1,Heq}$, $\theta_{i1,Heq}$, $k_{q1,Heq}$, and $\theta_{q1,Heq}$. Typically, $k_{i1,Heq}=\theta_{i1,Heq}=0$ will be assumed so that at the particular time $(t-t_m)=(2\pi f_{\phi,inst}-\omega_T)/\gamma_i:$ $\Delta k=(1+k_{q1,Heq})(1+k_{q1})-1-k_{i1}$, and $\Delta\theta=\theta_{q1}+\theta_{q1,Heq}-\theta_{i1}-\theta_{q0}.$ Given these equivalencies and conditions:

$$|x_V(t)|_{2\Delta\phi}|^2 = \left(\frac{M}{2}\right)^2\left(\frac{((1+k_{q1,Heq})(1+k_{q1})-1-k_{i1})^2+(\theta_{q1}+\theta_{q1,Heq}-\theta_{i1}-\theta_{q0})^2}{(1+k_{i1})^2+\theta_{q0}^2}\right).$$

That is, finding correct $k_{q1,Heq}$ and $\theta_{q1,Heq}$ for QDWS frequency $f_{\phi,inst}$ will cause an energy null at time $(t-t_m)=(2\pi f_{\phi,inst}-\omega_T)/\gamma_T$.

Simply restated, the idea is to adjust $k_{q1,Heq}$ and $\theta_{q1,Heq}$ until $|x_V(t)|_{2\Delta\phi}|^2=0$ for all $f_{\phi,inst}$.

A variety of techniques might be used to find optimal $k_{q1,Heq}$ and $\theta_{q1,Heq}$, including genetic algorithms, systematic search algorithms, and gradient search algorithms (as is the case with the LO feed-through analysis). Of note is that unlike $V_{L,I}$ and $V_{L,Q}$ for the LO feed-through problem, the influences of $k_{q1,Heq}$ and $\theta_{q1,Heq}$ on $|x_V(t)|_{2\Delta\phi}|^2=0$ are independent of the other. That is, each can be optimized independent of the other. All of this leads to a generic procedure for identifying optimal $k_{q1,Heq}$ and $\theta_{q1,Heq}$ as functions of instantaneous QDWS output frequency $f_{\phi,inst}$.

Procedure for Frequency-dependent Parameter Estimation

An overall algorithm and process for identifying frequency dependent values for $k_{q1,Heq}$ and $\theta_{q1,Heq}$ can be as follows:

1) Divide the QDWS output frequency range into segments no wider than $B_V$.
2) For each frequency segment, center it in the video passband with appropriate selection of $(t_m-t_s)$.
3) Generate data for new $k_{q1,Heq}$ and $\theta_{q1,Heq}$ functions, and extract the appropriate video component $|x_V(t)|_{2\Delta\phi}$.
4) Update estimates of more optimal $k_{q1,Heq}$ and $\theta_{q1,Heq}$ as a function of appropriate $f_{\phi,inst}$ based on measurements of energy at corresponding times $(t-t_m)$.
5) Go back to step 3 and repeat until satisfied with the results in this frequency range.
6) Go back to step 2 and repeat for the next frequency range until done.

As with the similar technique for LO feed-through suppression, no Fourier Transform is required. This again means that no corresponding benefit in noise reduction is available that the Fourier Transform brought. Consequently, adequate noise reduction might require enhanced coherent processing gain from Doppler processing, which is, collecting more pulses.

A variety of techniques can be used for updating $k_{q1,Heq}$ and $\theta_{q1,Heq}$ (genetic search, systematic searching, or gradient searching). The gradient search algorithm is herein described in detail.

Gradient Search for I/Q Balance

Recall that the instantaneous power in the appropriate component of the video signal being described by:

$$|x_V(t)|_{2\Delta\phi}|^2 = \left(\frac{M}{2}\right)^2\left(\frac{((1+k_{q1,Heq})(1+k_{q1})-1-k_{i1})^2+(\theta_{q1}+\theta_{q1,Heq}-\theta_{i1}-\theta_{q0})^2}{(1+k_{i1})^2+\theta_{q0}^2}\right).$$

Note that this represents an error surface or bowl over the $k_{q1,Heq}$, $\theta_{q1,Heq}$ plane. As previously stated, this error surface has both its local and its global minimum at:

$$k_{q1,Heq} = (1 + k_{i1,Heq}) \frac{(1 + k_{i1})}{(1 + k_{q1})} - 1, \text{ and}$$

where it can normally be assumed that $k_{i1,Heq} = \theta_{i1,Heq} = 0$. The gradient search algorithm is implemented via the updates:

$$k_{q1,Heq,new} = k_{q1,Heq,old} - \mu \frac{d}{dk_{q1,Heq}} |x_V(t)|_{2\Delta\phi}^2, \text{ and}$$

$$\theta_{q1,Heq,new} = \theta_{q1,Heq,old} - \mu \frac{d}{d\theta_{q1,Heq}} |x_V(t)|_{2\Delta\phi}^2,$$

where $\mu$ is a convergence constant, usually chosen to be small enough to allow gradual convergence.

The derivatives can be estimated by making measurements of the instantaneous power at times $(t-t_m)$ for slightly different values of the parameters in control and which are sought to br optimized, where:

$$\frac{d}{dk_{q1,Heq}} |x_V(t)|_{2\Delta\phi}^2 \approx \frac{\Delta |x_V(t)|_{2\Delta\phi}^2}{\Delta k_{q1,Heq}}, \text{ and}$$

$$\frac{d}{d\theta_{q1,Heq}} |x_V(t)|_{2\Delta\phi}^2 \approx \frac{\Delta |x_V(t)|_{2\Delta\phi}^2}{\Delta \theta_{q1,Heq}},$$

A suitable algorithm and process can then be:
1) Select initial $k_{q1,Heq}$ and $\theta_{q1,Heq}$.
2) Measure the energy at $(t-t_m)$ for $k_{q1,Heq} \pm (\Delta k_{q1,Heq}/2)$.
3) Update estimate for $k_{q1,Heq}$.
4) Measure the energy at $(t-t_m)$ for $\theta_{q1,Heq} \pm (\Delta \theta_{q1,Heq}/2)$.
5) Update estimates for $\theta_{q1,Heq}$.
6) Go back to step 2 and repeat until derivative estimates are zero (or satisfactorily near aero), or some other exit criteria is met.

Again, the nature of this gradient search technique is that the final imbalance level will be limited to somewhat below the noise floor of the desired signal, depending on convergence parameter $\mu$. In general, smaller values for $\mu$ would allow convergence to a lower noise floor, but cause slower convergence. Schemes might be employed whereby $\mu$ adapts from larger values to smaller values either with time, or as residual imbalance energy diminishes. As previously stated, this kind of adaptive algorithm sometimes goes by the name "simulated annealing."

Results of Simulation

As example of the techniques discussed, a simulation was run to demonstrate convergence to a solution where both LO feed-through and I/Q imbalance were mitigated. The results are illustrated in FIGS. 22A–D.

Parameters used in the simulation included:

M=4

RF center frequency=16.7 GHz

RF chirp bandwidth=1.0 GHz pulse width=1 μs video samples per pulse=2048 pulses integrated=64 video SNR=60 dB

Clearly, iterations can sink the problem energy into the noise floor, which can be lowered arbitrarily by integrating more pulses. Furthermore, integrating more pulses can also compensate a lesser video SNR.

Hardware Hooks Required

If LO feed-through is adequately stable and constant with input signal frequency from the QDWS, a single value for $(t_m-t_s)$ can be required to generate a video signal to facilitate estimation of offsetting DC inputs. This could be easily done with a short delay-line. If, however, the LO feed-through is QDWS frequency dependent, then some control is required over the quantity $\gamma_T(t_m-t_s)$ This is also true for the generally frequency dependent I/Q imbalance.

The ideal situation would be the incorporation of a delay line to generate the delay $t_s$ such that $t_s > T$ by enough time to allow switching the radar hardware from transmit to receive. The delay $t_m$ would be generated by initiating a second 'receive' pulse in the usual manner. Consequently, adjusting the quantity $(t_m-t_s)$ can be accomplished by adjusting the 'receive' chirp delay $t_m$. Both positive and negative relative timings can be so generated. Note that the important quantity to adjust is $\gamma_T(t_m-t_s)$, suggesting that for a fixed delay $(t_m-t_s)$ chirp rate $\gamma_T$ might be adjusted instead.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

We claim:

1. A method for adjusting waveform generation from a radar system employing QDWS and SSB mixer components, comprising the steps of:
   applying a rolling phase shift to the radar's QDWS signal, wherein said rolling phase shift is demodulated in a receiver; and
   separating at least one of LO feed-through energy and imbalance energy from a desired signal in Doppler.

2. The method of claim 1, further including the step of filtering the separated LO feed-through energy and imbalance energy from the receiver leaving the desired signal.

3. The method of claim 1, wherein said desired signal is provided as compensation for frequency dependent errors transmitted through components affecting radar signal quality.

4. The method of claim 1, wherein signal correction is provided as compensation for frequency dependent errors transmitted through the QDWS.

5. The method of claim 1, wherein signal correction is provided as compensation for frequency dependent errors transmitted through the SSB mixer.

6. The method of claim 3, further comprising the step of measuring the separated LO feed-through energy and imbalance energy in the receiver to thereby determine a degree of imbalance represented by said LO feed-through energy and imbalance energy.

7. The method of claim 6, further comprising using said degree of imbalance to determine calibration values that can to be provided to the QDWS to cause signal correction.

8. The method of claim 7, wherein signal correction is provided as compensation for frequency dependent errors in the QDWS.

9. The method of claim 7, wherein signal correction is provided as compensation for frequency dependent errors in the SSB mixer.

10. The method of claim 7, wherein signal correction is provided as compensation for frequency dependent errors in components affecting quadrature signal quality.

11. A method for adjusting waveform generation in a radar, comprising the steps of:
applying a rolling phase shift to the radar's QDWS signal, wherein said rolling phase shift is demodulated in a receiver;
separating LO feed-through energy and imbalance energy from a desired signal in Doppler; and
filtering the separated LO feed-through energy and imbalance energy from the receiver leaving the desired signal.

12. The method of claim 11, wherein said desired signal is provided as compensation for frequency dependent errors transmitted through components affecting radar signal quality.

13. The method of claim 11, wherein signal correction is provided as compensation for frequency dependent errors transmitted through the QDWS.

14. The method of claim 11, wherein signal correction is provided as compensation for frequency dependent errors transmitted through the SSB mixer.

15. The method of claim 11, further comprising the step of measuring the separated LO feed-through energy and imbalance energy in the receiver to thereby determine a degree of imbalance represented by said LO feed-through energy and imbalance energy.

16. The method of claim 15, further comprising using said degree of imbalance to determine calibration values that can to be provided to the QDWS to cause signal correction.

17. The method of claim 16, wherein signal correction is provided as compensation for frequency dependent errors in the QDWS.

18. The method of claim 16, wherein signal correction is provided as compensation for frequency dependent errors in the SSB mixer.

19. The method of claim 16, wherein signal correction is provided as compensation for frequency dependent errors in components affecting quadrature signal quality.

20. A method for adjusting waveform generation in a synthetic aperture radar system (SAR), comprising the steps of:
applying a rolling phase shift to the SAR's QDWS signal, wherein said rolling phase shift is demodulated in a receiver;
separating LO feed-through and imbalance energy from a desired signal in Doppler;
filtering the separated LO feed-through and imbalance energy from the receiver leaving the desired signal; and
measuring the separated LO feed-through energy and imbalance energy in the receiver to thereby determine a degree of imbalance represented by said LO feed-through energy and imbalance energy, wherein said degree of imbalance is further used to determine calibration values that can to be provided to the QDWS to cause signal correction.

21. The method of claim 20, wherein signal correction is provided as compensation for frequency dependent, errors in the QDWS.

22. The method of claim 20, wherein signal correction is provided as compensation for frequency dependent errors in the SSB mixer.

23. The method of claim 20, wherein signal correction is provided as compensation for frequency dependent errors in components affecting quadrature signal quality.

* * * * *